(12) United States Patent
Gardner, III

(10) Patent No.: US 7,485,883 B2
(45) Date of Patent: Feb. 3, 2009

(54) VARIABLE WAVELENGTH RADIATION SOURCE

(76) Inventor: William G. Gardner, III, 4608 W. Bluefield Ave., Glendale, AZ (US) 85308

( * ) Notice: Subject to any disclaimer, the term of this patent is extended or adjusted under 35 U.S.C. 154(b) by 378 days.

(21) Appl. No.: 11/483,931

(22) Filed: Jul. 10, 2006

(65) Prior Publication Data

US 2006/0261291 A1    Nov. 23, 2006

Related U.S. Application Data

(63) Continuation-in-part of application No. 10/742,704, filed on Dec. 19, 2003, now Pat. No. 7,148,497.

(51) Int. Cl.
*G01N 21/33* (2006.01)

(52) U.S. Cl. .............. 250/504 R; 250/493.1; 250/494.1; 250/505.1; 313/485; 313/486; 313/487

(58) Field of Classification Search .............. 250/504 R
See application file for complete search history.

(56) References Cited

U.S. PATENT DOCUMENTS

| | | | | |
|---|---|---|---|---|
| 4,967,090 | A * | 10/1990 | Schlitt | 250/504 R |
| 5,001,348 | A * | 3/1991 | Dirscherl et al. | 250/372 |
| 5,175,437 | A * | 12/1992 | Waluszko | 250/504 R |
| 5,233,198 | A * | 8/1993 | Changaris | 250/504 R |
| 5,241,170 | A * | 8/1993 | Field et al. | 250/214 VT |
| 5,387,801 | A * | 2/1995 | Gonzalez et al. | 250/504 R |
| 5,557,112 | A * | 9/1996 | Csoknyai et al. | 250/504 R |
| 5,670,786 | A * | 9/1997 | Meyer et al. | 250/494.1 |
| 5,736,744 | A * | 4/1998 | Johannsen et al. | 250/505.1 |
| 5,737,065 | A * | 4/1998 | Hansen | 355/113 |
| 5,898,816 | A * | 4/1999 | Heeger et al. | 392/408 |
| 5,998,789 | A * | 12/1999 | Kovalsky et al. | 250/302 |
| 6,512,236 | B2 * | 1/2003 | Seville | 250/458.1 |
| 6,527,985 | B1 * | 3/2003 | Frank et al. | 264/1.27 |
| 6,670,619 | B2 * | 12/2003 | Waluszko | 250/492.1 |
| 6,717,164 | B2 * | 4/2004 | Ullrich et al. | 250/504 R |
| 6,911,657 | B2 * | 6/2005 | Waluszko | 250/455.11 |

* cited by examiner

*Primary Examiner*—David A. Vanore
(74) *Attorney, Agent, or Firm*—Matthew P. Schmehl

(57) ABSTRACT

An apparatus for selectively producing one or more of a plurality of wavelength distributions of radiation. The apparatus comprises a primary UV radiation source and one or more wavelength transforming materials separated from the primary UV radiation source, that in response to irradiation by the primary UV radiation source, produce transformed radiation having a wavelength distribution that is different from the wavelength distribution of the primary UV radiation source. None, one, or more than one of the various WT materials can be selected by the apparatus,to allow the primary UV radiation, any individual transformed radiation, or any combination of the various radiations to be to be emitted from the apparatus.

24 Claims, 11 Drawing Sheets

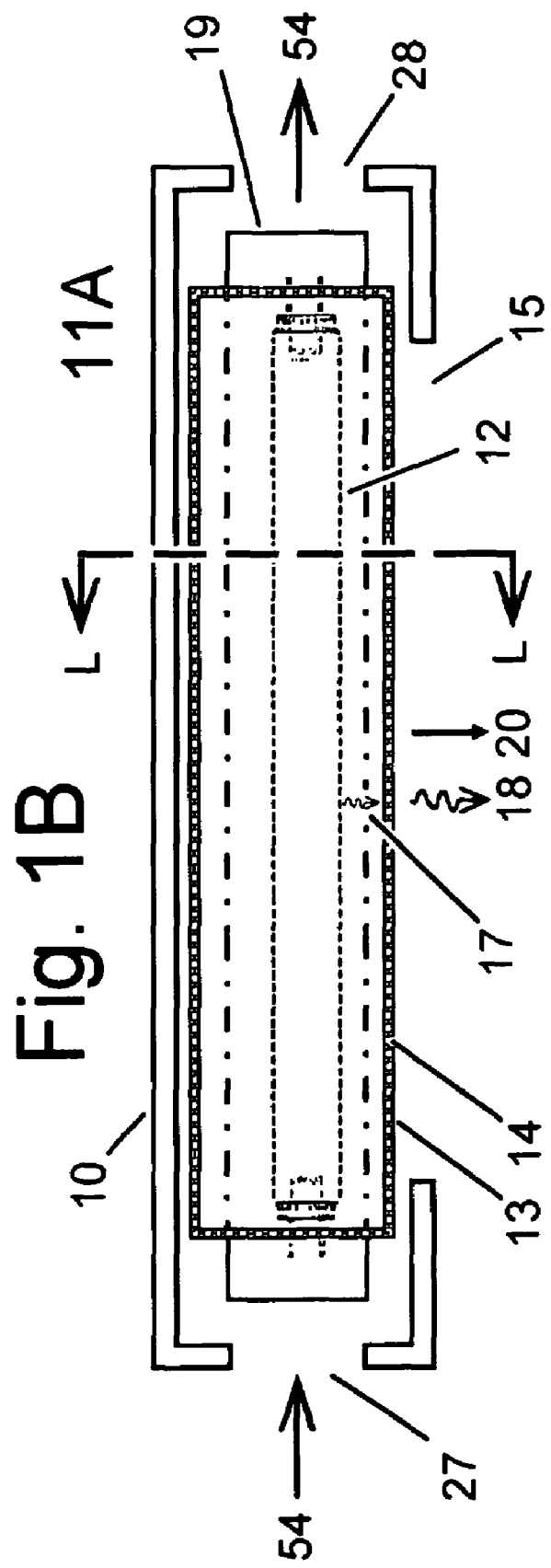

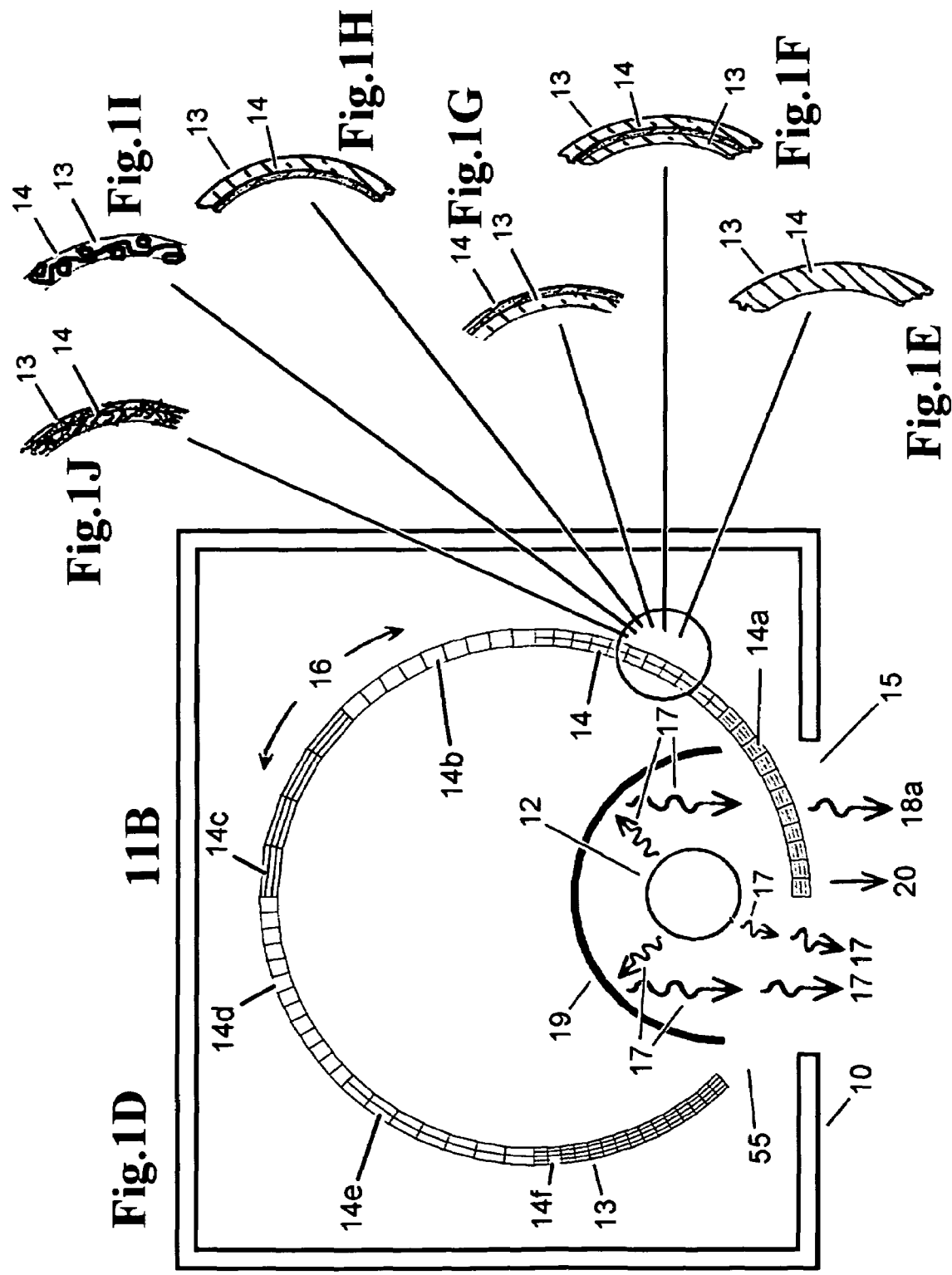

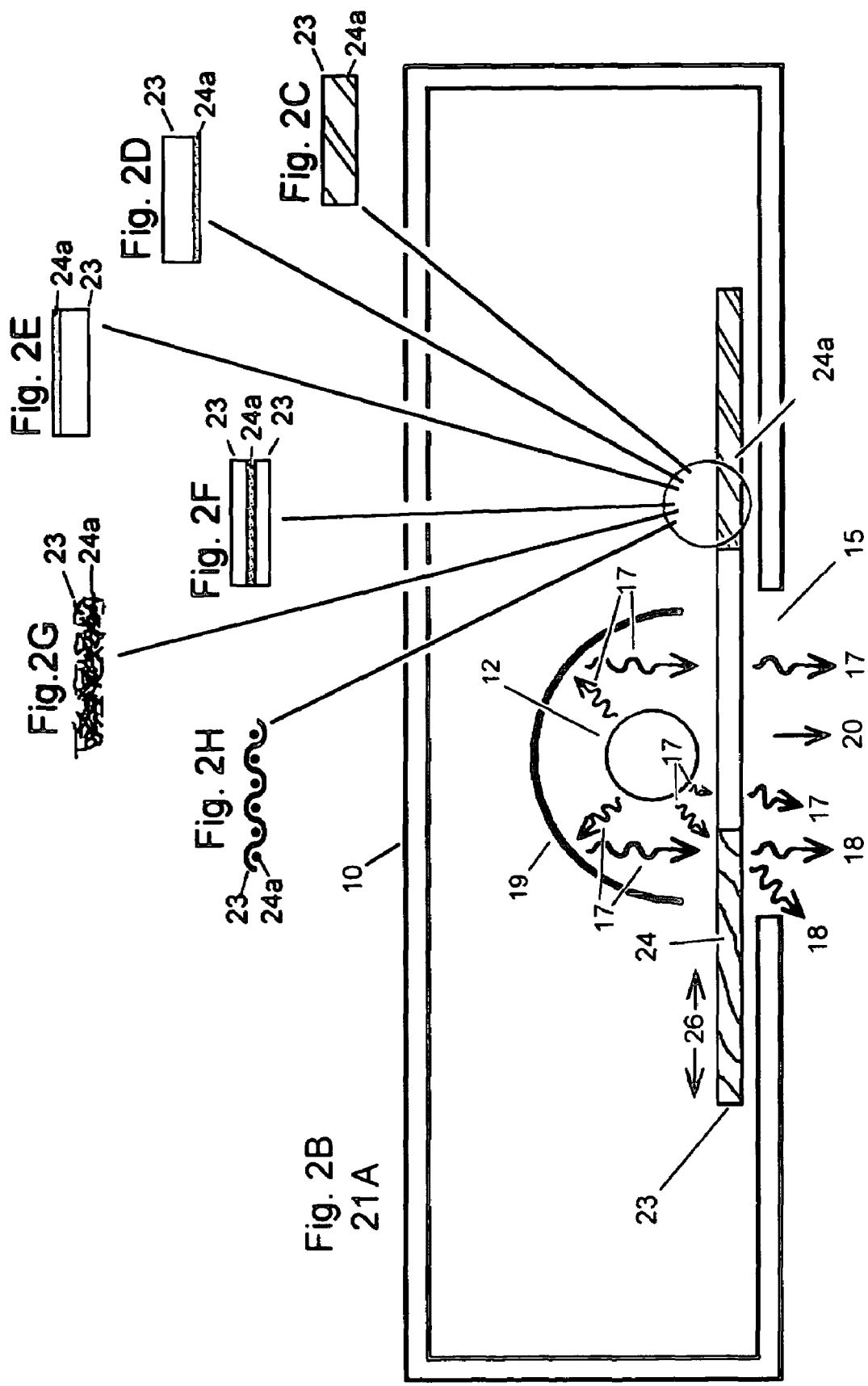

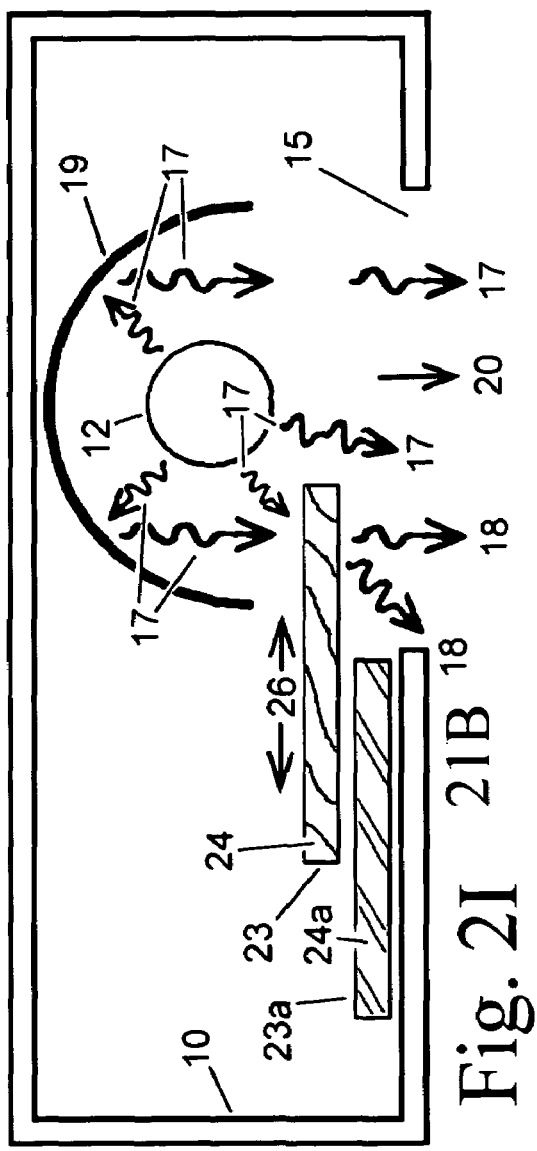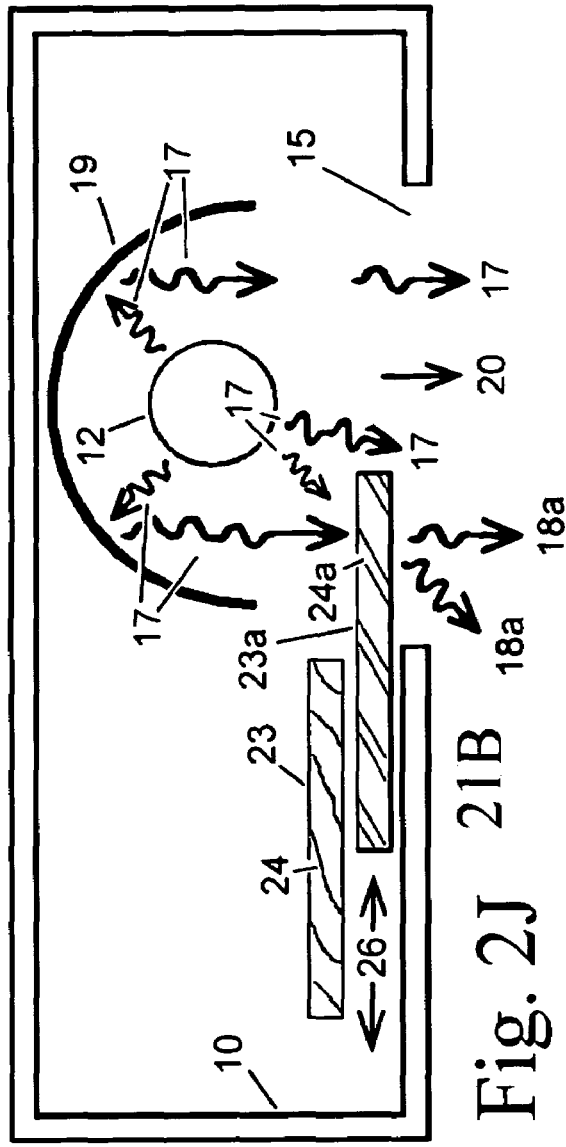

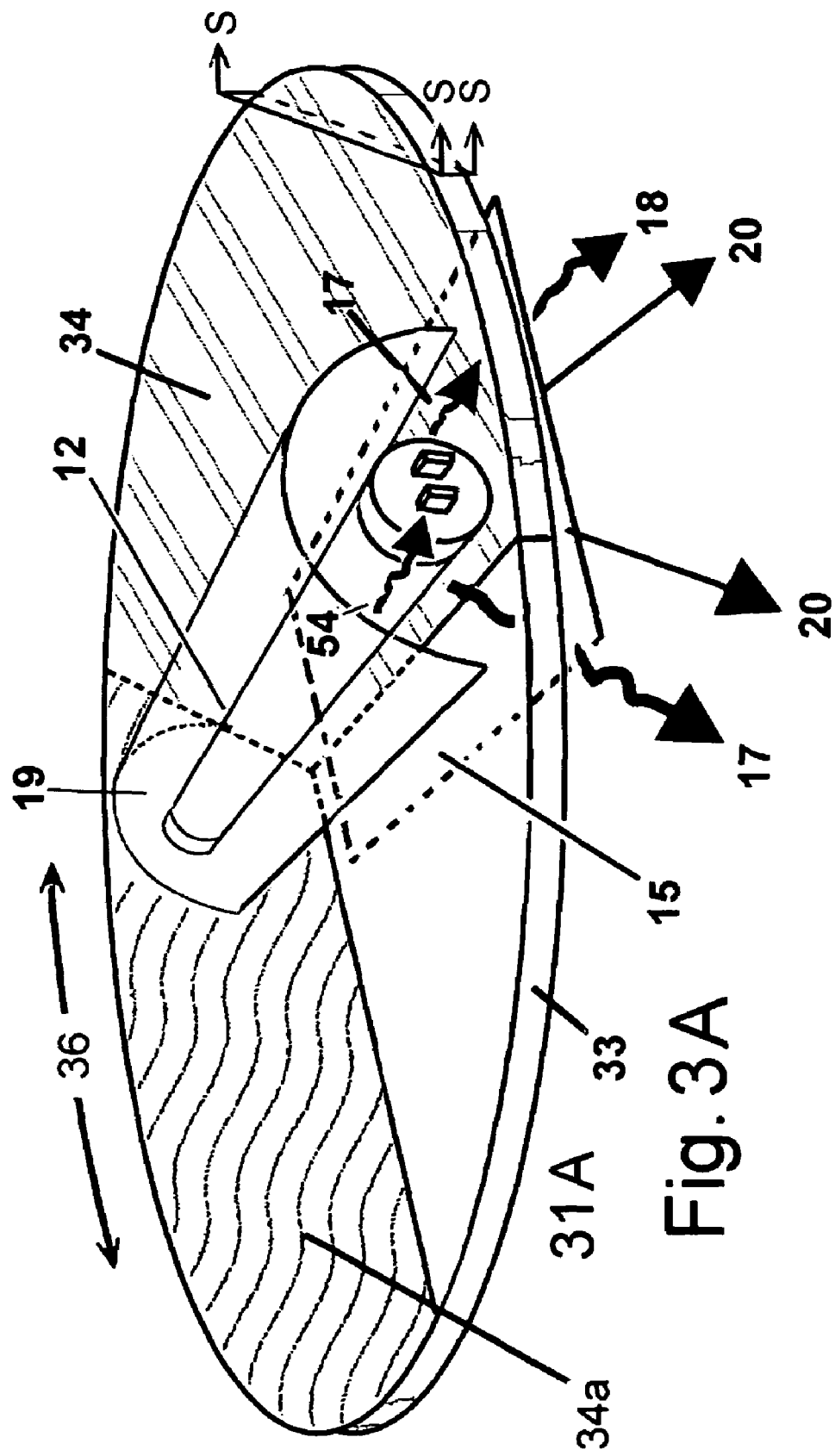

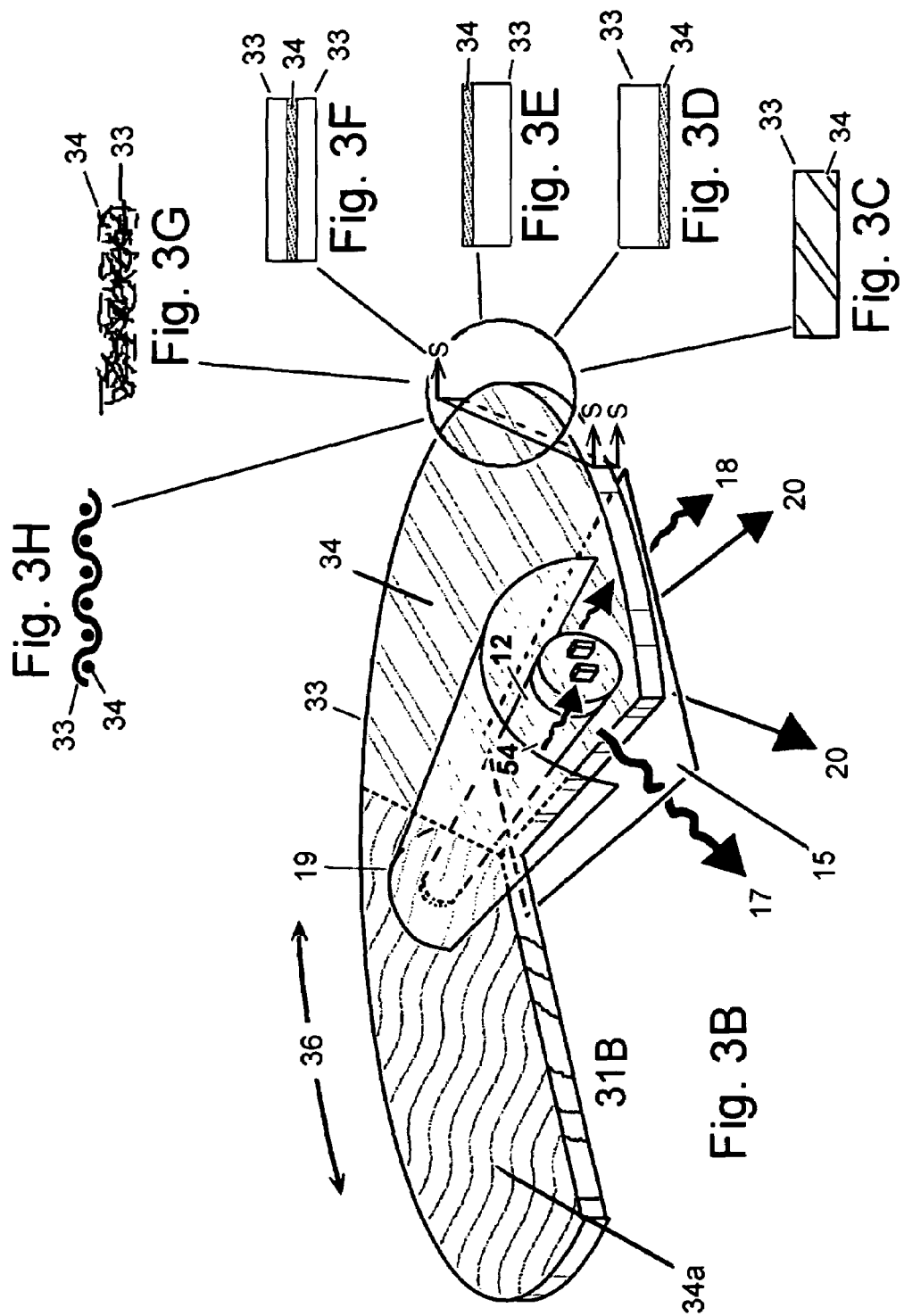

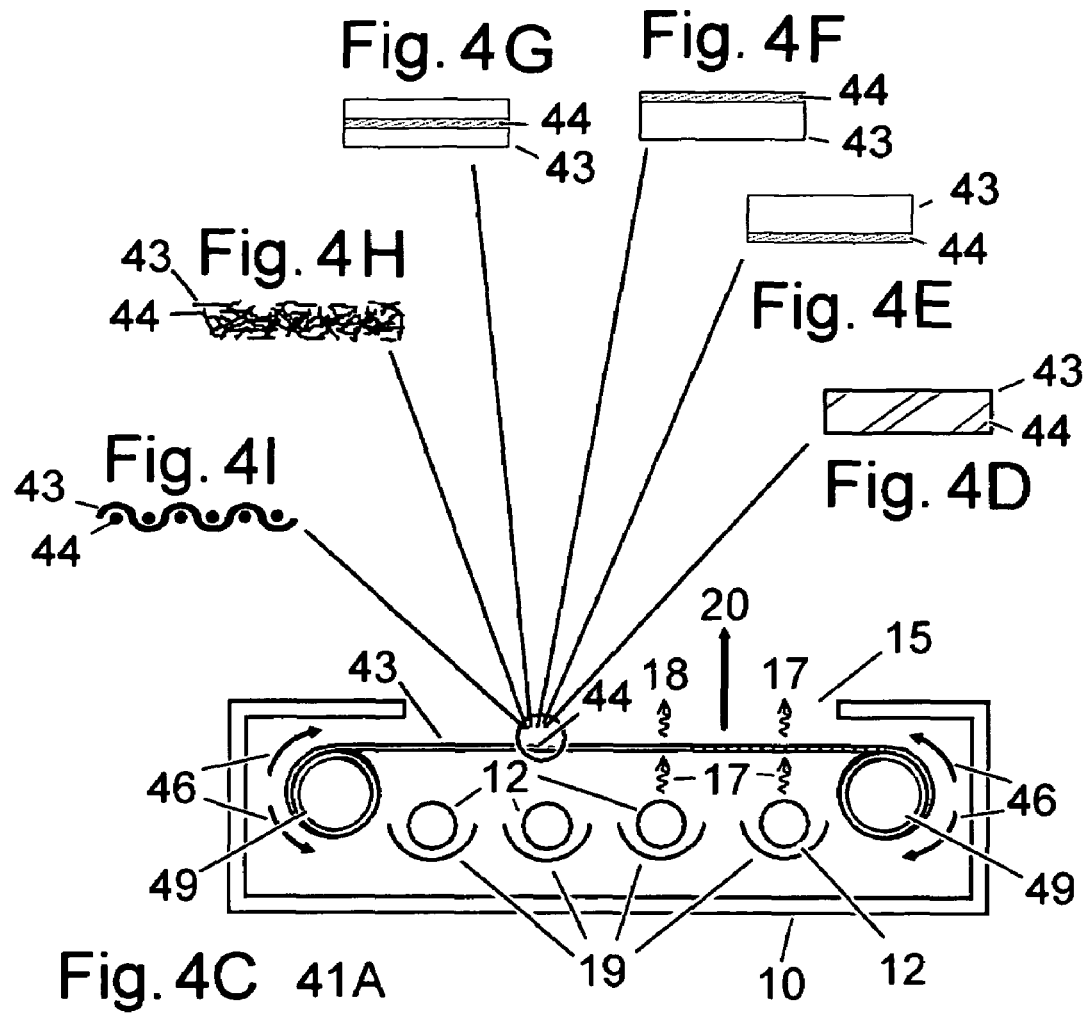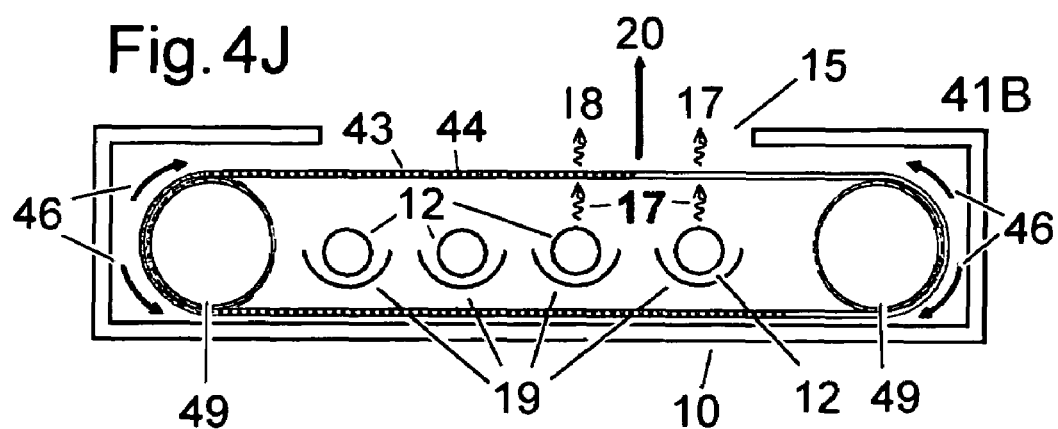

VARIABLE WAVELENGTH RADIATION SOURCE

CROSS-REFERENCE TO RELATED APPLICATIONS

This application is a continuation-in-part of U.S. application Ser. No. 10/742,704 Titled VARIABLE WAVELENGTH ULTRAVIOLET LAMP, filed Dec. 19, 2003, now U.S. Pat. No. 7,148,497 and is incorporated by reference in its entirety herein for all purposes

FIELD OF THE INVENTION

The present invention relates to ultraviolet, or UV, radiation emitting devices used in the fields of mineralogy; scientific research; forensics; UV sterilization of food, water, air, fluids, and surfaces; area illumination; photo-chemistry, photo-medical treatments, photo-lithography, artistic displays of fluorescent materials; and similarly related fields. Specifically, the present invention provides several related methods and devices whereby the wavelength distribution of radiation being emitted from an apparatus containing a primary UV radiation source can be transformed so as to be variable and adjustable.

BACKGROUND OF THE INVENTION

The electromagnetic spectrum ranges from cosmic rays at one end, to radio waves at the other end. The ultraviolet (UV) region of the electromagnetic spectrum is situated between visible light and x-rays, with the wavelengths of the UV A radiation being shorter and more energetic than violet visible light and the wavelengths of vacuum UV radiation being slightly longer and less energetic than x-rays. The full UV radiation spectrum ranges from wavelengths of about 100 nanometers (nm) to 400 nm and the UV radiation spectrum is usually divided into 4 sections; vacuum UV radiation (also called far or very UV, from 100 nm to about 200 nm), UV C radiation (also called germicide or short-wave UV, from 200 to about 280 nm), UV B radiation (also called mid-wave or medium-wave UV, from 280 nm to about 320 nm), and UV A radiation (also called "poster lamp", black-light, or long-wave UV, from 320 nm to 400 nm).

UV radiation can be emitted from a variety of sources such as: light emitting diodes (LED's), lasers, electric arcs (especially as in arc welding), xenon bulbs, halogen bulbs, excimer bulbs, and mercury vapor lamps/tubes of low, medium and high pressures. UV C radiation is used extensively for sterilization, purifying, and deodorizing applications in food, air, water, and general surface sterilization processes because the UV C radiation not only deactivates micro-organisms such as: bacteria, molds, spores, fungi, and viruses (by direct irradiation which damages the DNA such that the micro-organisms cannot reproduce), but the UV C radiation also breaks down the chemical bonds of alcohols, pesticides, chloramines, and other contaminants such as NDMA or MTBE. UV B radiation is the agent that causes human skin to "sun-burn" and the UV B radiation is needed to start the suntanning process. The lamps/tubes used in suntanning booths usually emit a combination of UV B and UV A. UV B is also used extensively in various medical treatments-especially for skin diseases. UV A radiation is used for special effect lighting, suntanning, photo-lithography, and photochemistry.

U.S. Pat. No. 6,787,782 teaches a system that uses UV radiation emitting LED's as one source of UV radiation for sterilizing air in a vehicle such as an airplane. Similarly, U.S. Pat. No. 6,233,748 teaches the use of UV radiation emitting LED's in combination with a reactive surface to sterilize air for breathing inside a helmet. However, both of these patents teach that the wavelength is selected at the time of manufacture. Neither of the patents provide any way to vary or transform the radiation from the UV radiation source, which would make the units much more versatile.

U.S. Pat. No. 6,893,610 describes an air purifier apparatus that forces air through two chambers each containing a different kind of low pressure mercury vapor lamp/tube. However, the apparatus requires multiple air chambers and several different varieties of mercury vapor lamps/tubes whereas a simpler apparatus would be more economical and easier to use.

U.S. Pat. No. 6,832,844 describes a way to use a fan to keep a UV radiation lamp/tube at an optimum temperature. However, the patent does not provide any way for the apparatus to emit a transformed UV radiation.

U.S. Pat. No. 5,334,347 teaches a way to overcome the skin effect cooling while simultaneously producing a UV radiation high output lamp/tube. However, the wavelength is selected and fixed at the time of manufacture, and the patent does not teach any way to vary or transform the radiation from the UV radiation source.

U.S. Pat. No. 6,337,483 teaches an apparatus for simultaneously sterilizing air and water with UV C radiation. However, the patent does not teach the use of ozone producing lamps/tubes, nor does it provide any exit port for the apparatus to emit either the primary UV radiation or a transformed radiation as selected by the user. U.S. Pat. No. 1,888,421 describes an apparatus whereby mercury is added to evacuated electrical discharge tubes containing small amounts of various types of inert gases in order to produce the UV radiation emissions characteristic of low pressure mercury vapor. Such UV radiation sources are commonly called either lamps or tubes, with the terms being interchangeable. U.S. Pat. No. 2,135,732 teaches the use of luminescent (phosphorescent or fluorescent) materials coated on the inside of a mercury vapor discharge lamp/tube to produce UV radiation of a different wavelength distribution from that of the low pressure mercury vapor primary UV radiation wavelength distribution. However, in both of these patents, the lamp/tube can only produce a certain fixed wavelength distribution of radiation set at the time of manufacture. Further, the apparatus does not provide any mechanism to vary or transform the radiation while the device is in use.

Generally, to build a fixture designed to selectively emit radiation in more than one wavelength distribution of UV radiation, a separate lamp/tube has been used for each of the desired wavelengths of radiation, UV A, UV B, or UV C radiation. U.S. Pat. No. 5,387,801 and U.S. Pat. No. 5,175,437 each describe an apparatus to select a desired emission wavelength distribution of radiation. However, in both of these patents, the need to use a different UV radiation source for each wavelength distribution of radiation is both expensive and cumbersome, and requires turning each lamp/tube on and off frequently, which is well known to shorten lamp/tube life.

U.S. Pat. No. 4,703,224 teaches coating the inside of a mercury vapor discharge lamp/tube with a mixture of two or more types of phosphors, to emit both UV A radiation and UV B radiation. Similarly, U.S. Pat. No. 4,967,090 and U.S. Pat. No. 5,557,112 each teach the idea of coating the inside of mercury vapor discharge lamps/tubes with two or more different types of phosphors, each in a specific zone or sector on the inside of the cylindrical envelope of the lamp/tube. However, it is well known that phosphors coated on the interior wall of a mercury vapor discharge lamp/tube suffer from exposure to the electric current, mercury atoms and ions, and short-wave UV radiation particularly of wavelengths less than 200 nm, for instance, the 185 nm far UV radiation emission of mercury vapor. U.S. Pat. No. 4,243,090 describes the loss of efficiency and drop in effective light production by phosphors due to these effects. Further, all of these patents teach that the phosphor is inside the lamp/tube where it is exposed to the harsh conditions that exist in that environment, and the wavelength distribution is selected and fixed at the time of manufacture. Further yet, none of these patents teach any way to vary or transform the radiation while the device is in use.

Similarly, U.S. Pat. No. 3,676,728 teaches a lamp/tube capable of producing selectable illumination using a plurality of types of phosphor coated on the interior of a mercury vapor discharge lamp/tube. As in the previous examples, this type of apparatus suffers from the disadvantage of damage to the phosphors that are exposed to the harsh conditions on the inside of a low pressure mercury vapor discharge lamp/tube. In addition, much of the energy of the mercury vapor is wasted because there is no way to direct it toward the desired phosphor in exclusion of phosphors placed at other locations within the lamp/tube.

In U.S. Pat. No. 5,736,744; U.S. Pat. No. 6,670,619; and U.S. Pat. No. 6,911,657, inventor Waluszko describes a wavelength shifting filter as only emitting one particular wavelength distribution of radiation. To select a different wavelength distribution of radiation, a particular flat conversion plate must be physically removed from the apparatus and replaced with a different flat plate. The system is cumbersome to use. In addition, the phosphor on the plates is uniformly distributed-Waluszko does not teach that the phosphors on the plates can be arranged to emit transformed radiation in a pattern, or that portions of the plate can remain phosphor free so that the primary UV radiation can also be transmitted.

U.S. Pat. No. 4,048,537, teaches a protective shield for a UV radiation lamp/tube. Similarly, U.S. Pat. No. 2,382,939 and U.S. Pat. No. 3,179,792, both teach a translucent glass or plastic sleeve for a standard fluorescent lamp/tube. However, all three of these patents teach that the phosphors are inside the lamp/tube envelope and none of those patents teach that the sleeve itself can be used as a means to convert or transform the primary UV radiation to another wavelength distribution of radiation.

U.S. Pat. No. 6,193,894 and the related U.S. Pat. No. 6,614,039, by inventor Brad Hollander, both teach sleeves made of UV C radiation transmitting fluoropolymers or silicone based materials (such as silicone polymers) that completely surround a low pressure mercury vapor lamp/tube to hermetically seal the lamp/tube. Neither patent makes reference to wavelength transforming materials with respect to the protective sleeve nor does either patent makes any reference to any UV radiation source other than a low pressure mercury vapor discharge tube.

SUMMARY OF THE INVENTION

The present invention provides an apparatus and a method for producing multiple and variable wavelength distributions of ultraviolet (UV) radiation, or visible radiation, comprising a primary UV radiation source, and a system of wavelength transforming (WT hereinafter) materials that allows selection between UV A, UV B, UV C, or far UV radiation; visible radiation; and infrared radiation. Further, the invention allows for more than a single WT material within the apparatus, so that any combination of the various radiations can be emitted from the apparatus in a preferred direction. The selection of the desired UV radiation is achieved through relative motion between the primary UV radiation source and the system of WT materials.

These and other features, aspects, and advantages of the present invention will become better understood with reference to the following drawings, description, and claims.

BRIEF DESCRIPTION OF THE DRAWINGS

FIG. 1B is a cross sectional view of apparatus 11A taken on the plane K-K-K of FIG. 1A.

FIG. 1D is a cross sectional view of apparatus 11B taken on line L-L of FIG. 1B showing a variation of the first embodiment having a section of the cylindrical WT filter removed.

FIGS. 1E, 1F, 1G, 1H, 1I, and 1J are expanded cross sectional views of a portion of the cylindrical WT filter of apparatus 11B, showing variations of the first embodiment wherein a variety of WT materials are coupled, integrated, or otherwise unified with the structure of the material comprising the cylinder wall.

FIG. 2B is a cross sectional view of apparatus 21A taken on the plane K-K-K.

FIGS. 2C, 2D, 2E, 2F, 2G, and 2H are expanded cross sectional views of a portion of the flat WT filter of apparatus 21A, showing variations of the second embodiment wherein a variety of WT materials are coupled, integrated, or otherwise unified with the UV transparent material comprising the WT filter.

FIGS. 2I and 2J are cross sectional views of apparatus 21B, showing another variation of the second embodiment where the WT materials are in the form of two or more substantially flat WT filters positioned within the apparatus.

FIG. 3A is a perspective, view of apparatus 31A, showing a third embodiment, wherein the WT materials are in the form of a rotatable flat disk shaped filter, having a pattern of WT materials as part of the flat disk.

FIG. 3B is a perspective view of apparatus 31B, showing a variation of the third embodiment of FIG. 3A, wherein a section of the rotatable flat disk shaped filter is removed.

FIGS. 3C, 3D, 3E, 3F, 3G, and 3H, are expanded cross sectional views of a portion of the substantially flat disk shaped WT filter of apparatus 31B taken on the plane S-S-S, showing variations of the third embodiment where a variety of WT materials are coupled, integrated, or otherwise unified with the UV transparent material comprising the substantially flat disk shaped WT filter.

FIG. 4C is a cross sectional view of apparatus 41A taken on the line K-K of FIG. 4A, showing a variation of the fourth embodiment, wherein the WT materials are coupled with a WT filter in the form of a flexible sheet or belt WT filter winding and unwinding around cylindrical rollers.

FIGS. 4D, 4E, 4F, 4G, 4H, and 4I, are expanded cross sectional views of a portion of the flexible sheet or belt WT filter of apparatus 41A, showing variations of the fourth embodiment where a variety of WT materials are coupled, integrated, or otherwise unified with the flexible sheet or belt material comprising the WT filter.

FIG. 4J is a cross sectional view of apparatus 41A of FIG. 4A taken on the line K-K of FIG. 4A, showing a variation of the fourth embodiment, wherein the WT materials are coupled with a WT filter in the form of an endless flexible sheet or belt rotating past cylindrical rollers.

DETAILED DESCRIPTION OF THE INVENTION

Figure 1A:
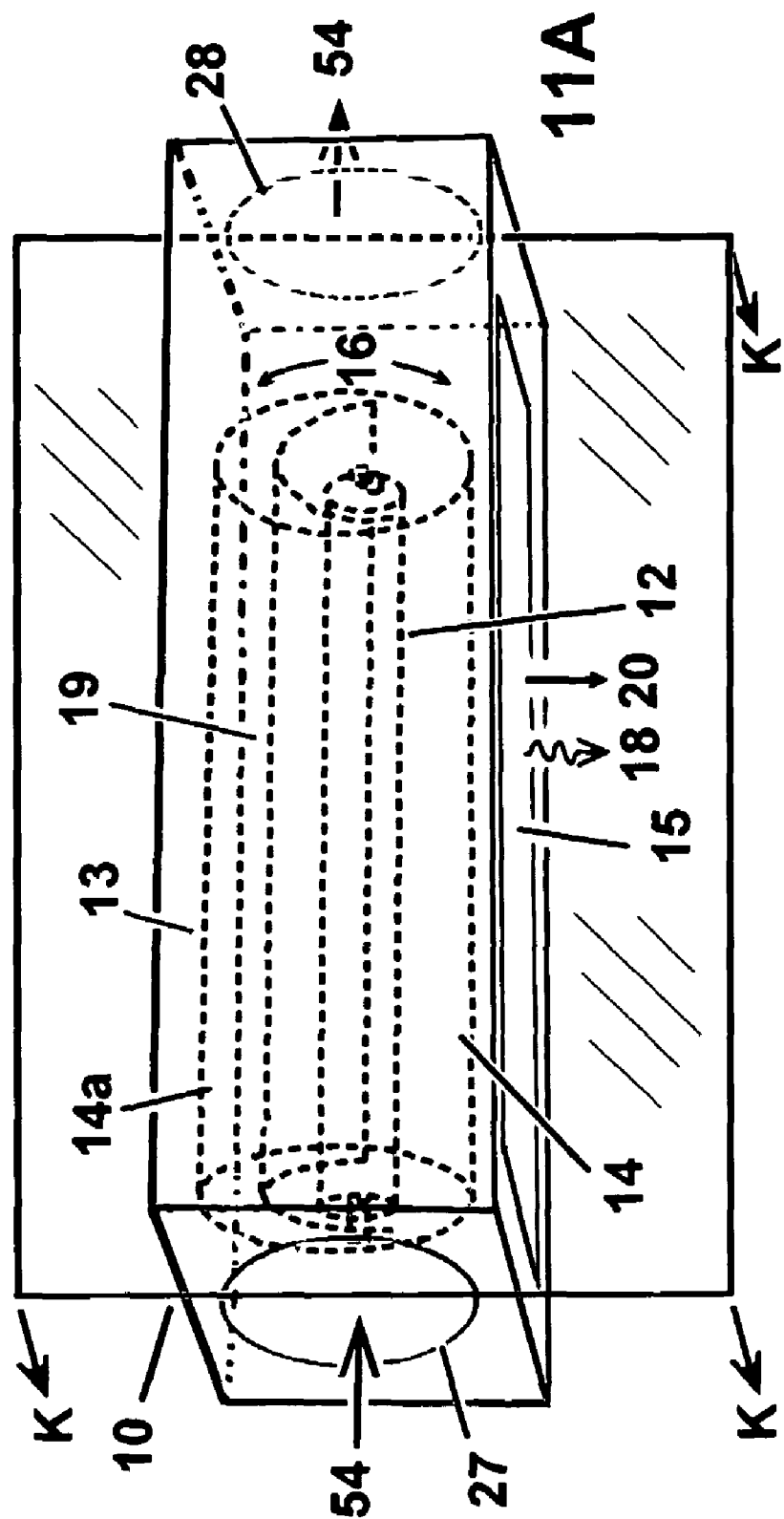
FIG. 1A is a perspective view of apparatus 11A, showing a first embodiment of a variable wavelength radiation source, wherein an enclosure contains a cylindrical wave transforming (WT) filter.

For the purposes of this invention, the primary UV radiation source can be chosen from many UV emitters. Examples include, although are not limited to: light emitting diodes (LED's), lasers, electric arcs, xenon lamps/bulbs, excimer lamps/bulbs, and mercury vapor tubes/amps of low, medium and high pressures, etc. as would be understood by those skilled in the art.

The WT materials of the embodiments can comprise any material or system that: absorbs radiation of one wavelength or band of wavelengths and emits radiation of another wavelength or band of wavelengths; or any material that filters the incident wavelength distribution of radiation such that only a portion of the incident radiation is allowed to pass through the filter, thus modifying the wavelength distribution of radiation. Although the WT materials are typically phosphors, any of a wide variety of WT materials (including but not limited to: phosphors, QDOTS®, or band pass filters), can be used in this invention without departing from the teaching. For the purposes of this invention, the portion of the apparatus that transforms the primary UV radiation will be called a wavelength-transforming (WT) filter. The WT filter comprises, either as a coupled addition, or as an integral part, the WT materials integrated with a structural member to become a WT filter. Alternatively, the WT materials can have structural properties themselves such that the WT material is self-supporting thus also forming the WT filter. If the structural support is needed, the WT materials can be bonded, fused, glued, blended, conjoined, fastened, united, merged, joined, integrated, or otherwise unified with the structural material comprising the structure of the WT filter. It should be noted that structural material necessarily possesses UV transmitting properties. The WT material can be coupled on either side of the UV transmitting structural material surface, sandwiched between two layers of UV transmitting structural materials, disposed internally to the UV transmitting structural material, or the WT material can be bonded, fused, glued, blended, conjoined, fastened, united, merged, joined, integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the WT filter. It should be noted that in the case of sandwiching the WT material between two layers of UV transmitting structural materials, the second layer, furthest from the primary UV source, need only be transparent to the transformed wavelength.

If the WT filter is to be hard and rigid, the structural material comprising the WT filter can be chosen from the group of materials that includes, but is not limited to: natural or synthetic fused quartz or quartz glass, borosilicate glass, natural or synthetic calcium fluoride (also the other metallic fluorides such as barium, lithium, sodium, magnesium, strontium, and lanthanum fluoride), natural or synthetic sapphire, magnesium oxide, hard glass, lime glass, chemical PYREX®, sapphire glass, or UV transmitting or UV minimizing PLEXIGLAS®. If the WT filter is to be flexible, the structural material comprising it can be a hard material that is fashioned into a mat or woven into a cloth or mesh that can be flexible, or the material can chosen from the group of flexible materials that include silicone polymers and fluoropolymers. One such group of fluoropolymers is the TEFLON® family which have acronyms such as ETFE, TEFZEL®, PFA, PTFE, FEP and EFEP.

WT radiation is only emitted from the apparatus by WT materials that lie between the primary UV radiation source and a radiation exit port. The preferred presence of a reflector unit is of assistance in directing the radiation from the primary UV radiation source onto the selected WT material and for shading the unselected WT materials. The selection mechanism enables one or more wavelength distributions of transformed radiation to be chosen for emission from the apparatus. It is also to be understood that two different portions of the WT filter can be placed partially between the primary UV radiation source and the exit port, so that more than one wavelength distribution of transformed radiation can be selected for simultaneous emission. Additionally, a portion or portions of the WT filter can be transparent to UV radiation, or not combined with a WT material, so that one of the wavelength distributions of radiation that can be emitted is the primary UV radiation itself. Additionally, as even the best UV transmitting materials have some attenuation losses as the UV passes through the material, it is to be understood that a portion of the WT filter can actually be removed to prevent unnecessary attenuation losses. It should be further understood that the WT materials can be chosen to transform the primary UV radiation into UV A, UV B, or UV C radiation, visible white light, visible colored light, invisible infrared radiation and any combinations thereof.

With reference now to the Figures, FIGS. 1A-4J show various embodiments of the present invention. The present invention provides a means for selectively producing one or more of a plurality of wavelength distributions of radiation, comprising one or more primary UV radiation sources having a primary wavelength distribution of radiation, at least one movable WT material proximate to the primary UV radiation source, or sources, that, in response to irradiation by the primary UV radiation source causes the apparatus to emit a transformed radiation that is different from the primary UV radiation. The invention also has a selection mechanism for placing none, one or more than one WT materials between the primary UV radiation source(s) and a radiation exit port, such that the selected wavelength distribution of radiation is emitted from the apparatus in the preferred direction out the radiation exit port A reflector unit may also be incorporated within the apparatus to direct the primary UV radiation towards the selected WT material and to shade the unselected WT materials.

Figure 4A:
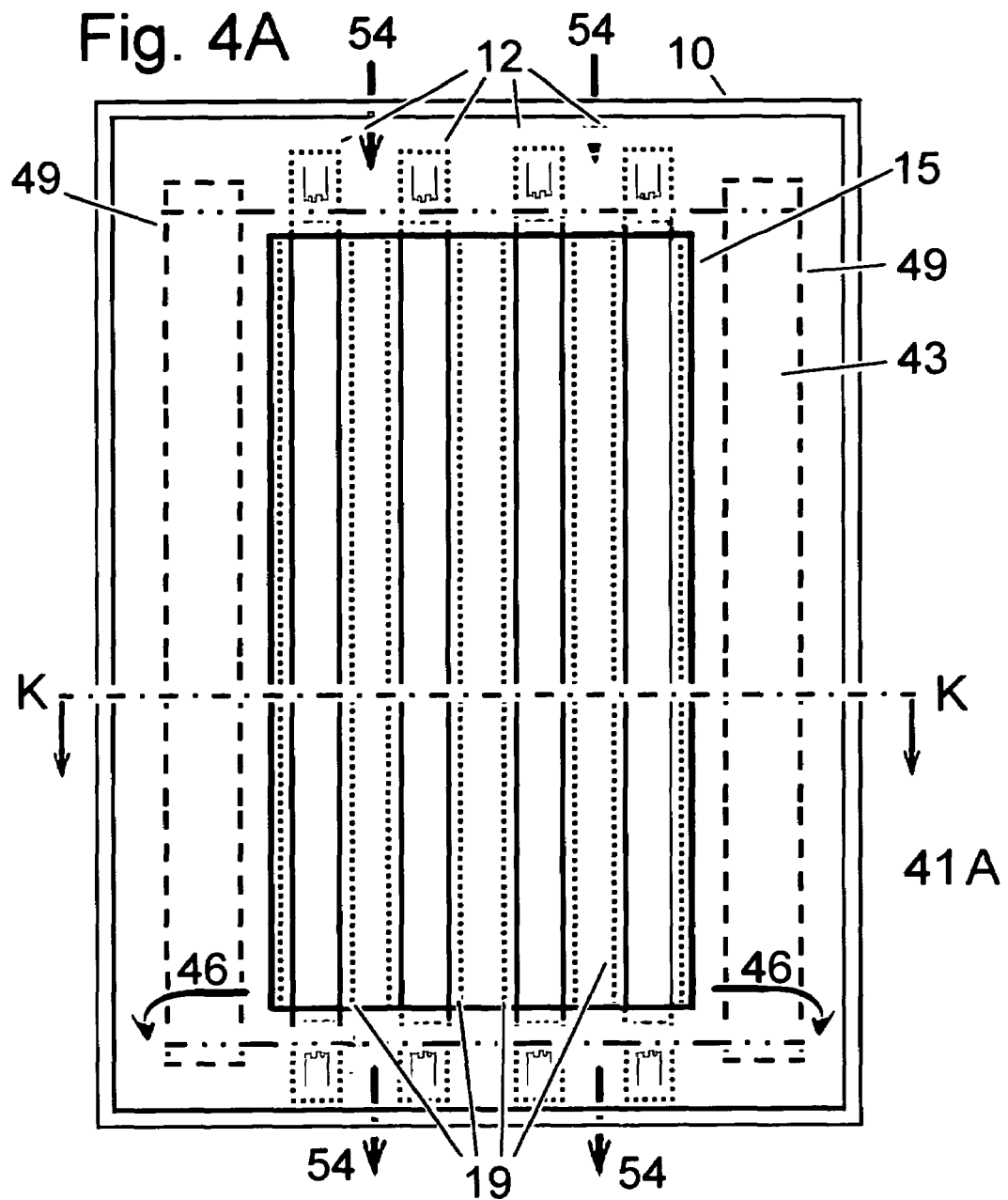
FIG. 4A is a plan view of apparatus 41A, showing a fourth embodiment, wherein the WT filter is a flexible sheet or belt WT filter and selection of the radiation to be emitted is made by movement of the flexible sheet or belt WT filter past the primary UV radiation source.

A WT material selection mechanism is provided to select which portion, if any, of the WT materials 14, 24, 34, and 44, (note that 14, 24, 34, and 44 denote the series of 14, 14a, 14b, etc, 24, 24a, etc. as applicable in this specification) is positioned between the primary UV radiation sources 12 and the radiation exit port 15 of the apparatus 11A, 11B; 21A, 21B, 31A, 31B, 41A and 41B. The selection mechanism provides a means of providing relative motion between the radiation sources 12 and the WT material 14, 24, 34, and 44. This relative motion can be achieved in various ways, including rotation 16 of a cylindrical WT filter 13 (FIG. 1A), lateral movement 26 of a substantially flat WT filter 23 (FIG. 2A), planar rotational movement 36 of a substantially flat disk shaped WT filter 33 (FIG. 3A), or a combination of rotational and lateral movement 46 of a flexible sheet or belt WT filter 43 in the form of a flexible sheet about cylindrical rollers 49 (FIG. 4A). An advantage of such relative motion is that it can extend the useful lifetime of the primary UV radiation source (s) by providing a means of varying or transforming the radiation emission of the apparatus without cycling the primary UV radiation source on and off as required by the prior art.

Turning now specifically to FIG. 1A, a perspective view of apparatus 11A, showing a first embodiment of the present invention of a variable wavelength radiation source, wherein an enclosure contains a cylindrical shaped wave transforming (WT) filter, and FIG. 1B, a cross-sectional view of the first embodiment apparatus 11A, taken on the plane K-K-K of FIG. 1A, the first embodiment is shown as apparatus 11A. Apparatus 11A has an enclosure 10, a radiation exit port 15, and one or more primary UV radiation sources 12 which emit a primary UV radiation 17 (See FIG. 1B). The primary UV radiation sources 12 are surrounded by a cylindrical WT filter 13. Placed proximate to the primary UV radiation sources 12 are WT materials 14 and 14a that are uniformly distributed upon, or integral to, the walls of the cylindrical WT filter 13. Additionally, a portion of the material comprising the basic structure of the cylindrical WT filter 13 itself, can have WT properties without the addition of any other wavelength transforming material 14 or 14a. Further, as discussed above, the WT materials 14 and 14a can be bonded, fused, glued, blended, conjoined, fastened, united, merged, joined, integrated, or otherwise combined in a plurality of ways with the structure of the cylindrical WT filter 13 (these variations of how the WT materials 14 and 14a are associated with the wall of the cylindrical WT filter 13 will be shown in more detail in FIGS. 1E through 1J). WT materials 14 and 14a can be applied to: the outer surface of the UV transparent material forming the structure of the cylindrical WT filter 13; the inner surface of the cylindrical WT filter 13; or laminated (or sandwiched) between two layers of the UV transparent material forming the cylindrical WT filter 13. The WT materials 14 and 14a can also be integral with the physical structure of a UV transparent material having a fiber or wire-like shape and thus forming the cylindrical WT filter 13 either by forming a cylindrical mat of such shapes or by weaving such shapes into a cloth-like material. Further, as previously discussed, the WT materials 14 and 14a can be integrated, or otherwise combined in a plurality of ways, with the outer surface of a UV transparent material having a fiber or wire-like shape and thus forming the cylindrical WT filter 13 either by forming a cylindrical shaped mat of such fibers or wires or by weaving such fibers or wires into a cloth-like material. The reflector 19 is disposed within the cylindrical WT filter 13, and placed on the opposite side of the primary UV radiation source 12 from the radiation exit port 15, so that the reflector 19 directs the primary UV radiation 17 in the preferred direction of emission 20 towards the selected portion of the cylindrical WT filter 13 and thus also towards the radiation exit port 15. The reflector 19 also shades the unselected portions of the cylindrical WT filter 13. As discussed above, a portion of the cylindrical WT filter 13 can be made transparent to the primary UV radiation 17, to allow untransformed primary UV radiation 17, (See FIG. 1D), to be emitted from the radiation exit port 15. An arrow shows the transformed radiation 18 being emitted from WT material 14 in a preferred direction of emission 20. Because the cylindrical WT filter 13 is external to the envelope of the primary UV radiation source 12, the WT materials 14 and 14a are not exposed to the harsh environment that exists in many primary UV radiation sources 12, thus greatly extending the useful life of the WT material 14 or 14a. Note however that some possible sources of primary UV, e.g. LEDs as previously mentioned, do not create a harsh environment.

An additional feature of the present invention is shown by the arrow representing fluid flow 54 (air or a gas or another type of fluid) passing through the fluid inlet port 27 and exiting the fluid exit port 28 thus passing through the volume created between the three elements consisting of the primary UV radiation source 12, the reflector 19 and the cylindrical WT filter 13. The fluid flow 54 cools the primary UV radiation source 12 at the same time as the primary UV radiation 17 sterilizes and sanitizes the fluid flow 54. This invention shows that the primary UV radiation 17 can sterilize a flow of air or other fluids 54 and then the primary UV radiation 17 can subsequently be converted to a transformed radiation 18. Thus an apparatus 11A can be made wherein the fluid flow 54 is air from a space, such as a room, and wherein the apparatus 11A not only provides a selection of emitted wavelength distributions of radiation 17, 18 or 18a, (one of which can be white light for general lighting), but at the same time the apparatus provides a means for sterilization and sanitation of the air in a room. Line L-L indicates the position of a cross sectional drawing FIG. 1D.

Figure 1C:
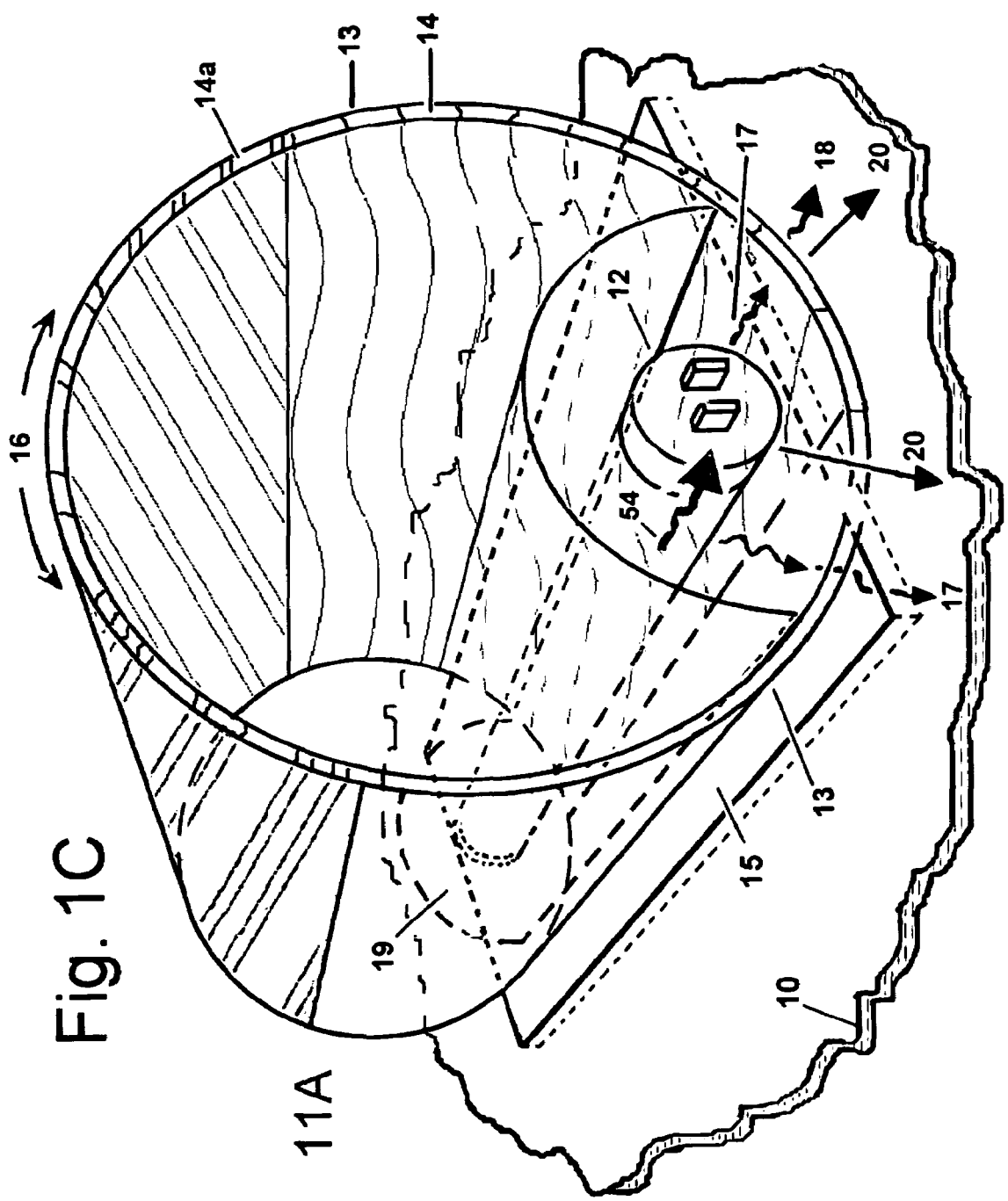
FIG. 1C is a perspective view of apparatus 11A with most of the enclosure 10 cut away to more easily show the internal parts of the first embodiment of FIG. 1A

FIG. 1C, a cut away perspective view of apparatus 11A shown in FIG. 1A with most of the housing 10 cut away for a better view of the internals. As before, the housing 10 contains the primary UV radiation source 12 which emits primary UV radiation 17 in a preferred direction 20 towards a radiation exit port 15. Arrows show the relative rotational motion 16 of the cylindrical WT filter 13 about the primary UV radiation source 12. The relative motion may be imparted in a variety of means such as by electric motors, stepper motors, an electromagnetic plunger and pawl device, an air motor, etc. As in the previous discussion, the WT materials 14 and 14a can be affixed to, or integral to the cylindrical WT filter 13 in a plurality of ways. However, this particular figure shows the WT materials 14 and 14a as being distributed uniformly integral to portions of the wall of the WT filter 13, also as before, the structural material of the cylindrical WT filter 13 may also have WT properties without the addition of any other WT materials. A portion of the WT filter 13 has a UV transparent section, i.e. neither WT materials 14 and 14a are present, to allow the primary UV radiation 17 to be emitted from the radiation exit port 15 in a preferred direction 20. The reflector 19 directs the radiation towards the radiation exit port 15. An arrow shows the transformed radiation 18 being emitted from the radiation exit port 15, after the primary UV radiation 17 passes through the WT material 14. Note that although Fluid flow 54 is shown, the fluid entrance port 27 and the fluid exit port 28 are not shown in this view due to the enclosure 10 cut away.

FIG. 1D, a cross-sectional view of apparatus 11B taken on the line L-L of FIG. 1B, shows a variation of the first embodiment 11A wherein a portion of the cylindrical WT filter 13 has a void, exit port, or slit 55, to allow unfiltered and untransformed primary UV radiation 17 to be emitted from the exit port 15. This feature prevents unnecessary attenuation of the primary UV radiation 17 by the material of the cylindrical WT filter 13. Thus allowing for a stronger primary UV radiation 17 emission from the apparatus 11B at that time. As before, the housing 10 contains the primary UV radiation source 12 that emits primary UV radiation 17 in a preferred direction 20 towards a radiation exit port 15. Reflector 19 directs the primary UV radiation 17 towards the radiation exit port 15. Arrows show the relative rotational motion 16 of the cylindrical WT filter 13 about the primary UV radiation source 12. A plethora of WT materials 14, 14a, 14b, 14c, 14d, 14e, and 14f are associated with the cylindrical WT filter 13 and are shown as being distributed uniformly within the wall of the WT filter 13. An arrow shows the transformed radiation 18a being emitted from the radiation exit port 15 after the primary UV radiation 17 passes through the WT material 14a.

As previously explained, the WT materials 14, 14a, 14b, etc., can be integrated, or otherwise combined in a plurality of ways with the material comprising the cylindrical WT filter 13. FIGS. 1E, 1F, 1G, 1H, 1I, and 1J are expanded cross sectional views of a portion of the cylindrical WT filter 13 of apparatus 11B, showing variations where the WT materials 14, 14a, 14b, 14c, 14d, 14e, 14f, possess different WT properties thus showing that a plurality of different transformed radiation emissions may be achieved in the present invention. Additionally, with reference to FIGS. 1E, 1F, 1G, 1H, and 1J, these Figures show enlarged portions of the WT material 14 in combination with the WT filter 13. As previously explained, FIGS. 1E, 1F, 1G, 1H, and 1J show examples of the UV transmitting structural material, or the WT material 14 being coupled, or affixed, upon, within, or integral to the WT filter 13 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the WT filter 13.

Specifically, FIG. 1E is an expanded view of a portion of the wall of the cylindrical WT filter 13 of apparatus 11B, showing a variation wherein the WT material 14, (representative of any selected WT material), is integral to the structure of the material comprising the cylindrical WT filter 13. Those skilled in the art will recognize that FIG. 1E could also represent a WT filter 13 which inherently has WT properties without the addition of any other WT material 14, 14a, 14b, etc.

FIG. 1F is an expanded view of a portion of the wall of the cylindrical WT filter 13 of apparatus 11B, showing a variation wherein the WT material 14, (representative of any selected WT material) is sandwiched, in such manner as previously discussed, between two layers of UV transparent material comprising the cylindrical WT filter 13.

FIG. 1G is an expanded view of a portion of the wall of the cylindrical WT filter 13 of apparatus 11B, showing a variation wherein the WT material 14, (representative of any selected WT material) is affixed upon, in such manner as previously discussed, the outer surface of the cylindrical WT filter 13.

FIG. 1H is an expanded view of a portion of the wall of the cylindrical WT filter 13 of apparatus 11B, showing a variation wherein the WT material 14, (representative of any selected WT material) is affixed upon, in such manner as previously discussed, the inner surface of the cylindrical WT filter 13

FIG. 1I is an expanded view of a portion of the wall of the cylindrical WT filter 13 of apparatus 11B, showing a variation wherein the WT material 14, (representative of any selected WT material) is distributed within fiber or wire like shapes that form a mat comprising the material of the cylindrical WT filter 13. For example, a particular WT material 14 can be mixed into molten UV transmitting glass, which is then, as previously discussed, formed into a wire-like shape or a fiber, such as that of fiber optic cable or fiber-glass. These wires or fibers can then be cut into pieces and laid down upon one another to form a mat, etc. The mat can then be formed into various shapes including a cylinder. It should be noted that the WT material 14, (representative of any selected WT material) can also be integrated, or otherwise associated with the outside of the fiber or wire-like shape.

FIG. 1J is an expanded view of a portion of the wall of the cylindrical WT filter 13 of apparatus 11B, showing a variation of the first embodiment where the WT materials are associated with fiber or wire like shapes that form a woven mesh comprising the material of the cylindrical WT filter 13. As an example, a woven fiber-glass cloth wherein the individual fibers have WT material 14 included in the composition. As a variation, the WT material 14, (14a, 14b, etc.) can also be bonded, fused, glued, blended, conjoined, fastened, united, merged, joined, integrated, or otherwise associated with the outside of the fiber or wire-like shape.

In a second embodiment of the present invention one or more primary UV radiation sources are placed behind at least one substantially flat WT filters. Portions of the flat filter(s) are coupled with different WT materials each of which is capable of producing a transformed radiation upon irradiation by the primary UV radiation. In this embodiment, another portion of a substantially flat filter can remain transparent to the primary UV radiation. To easily switch between different radiation emissions, the device moves the substantially flat WT filter(s) into position such that the desired WT material, the transparent region, or a void or slit in the flat filter, lies between the primary UV radiation source and the radiation exit port of the apparatus. This movement can be accomplished by a mechanical or electrical means through a linear lateral or planar rotating motion of the substantially flat WT filter, such that none, one, or more than one of the WT materials are placed between the primary light source and the radiation exit port of the apparatus to select any combination of wavelengths of radiation.

Figure 2A:
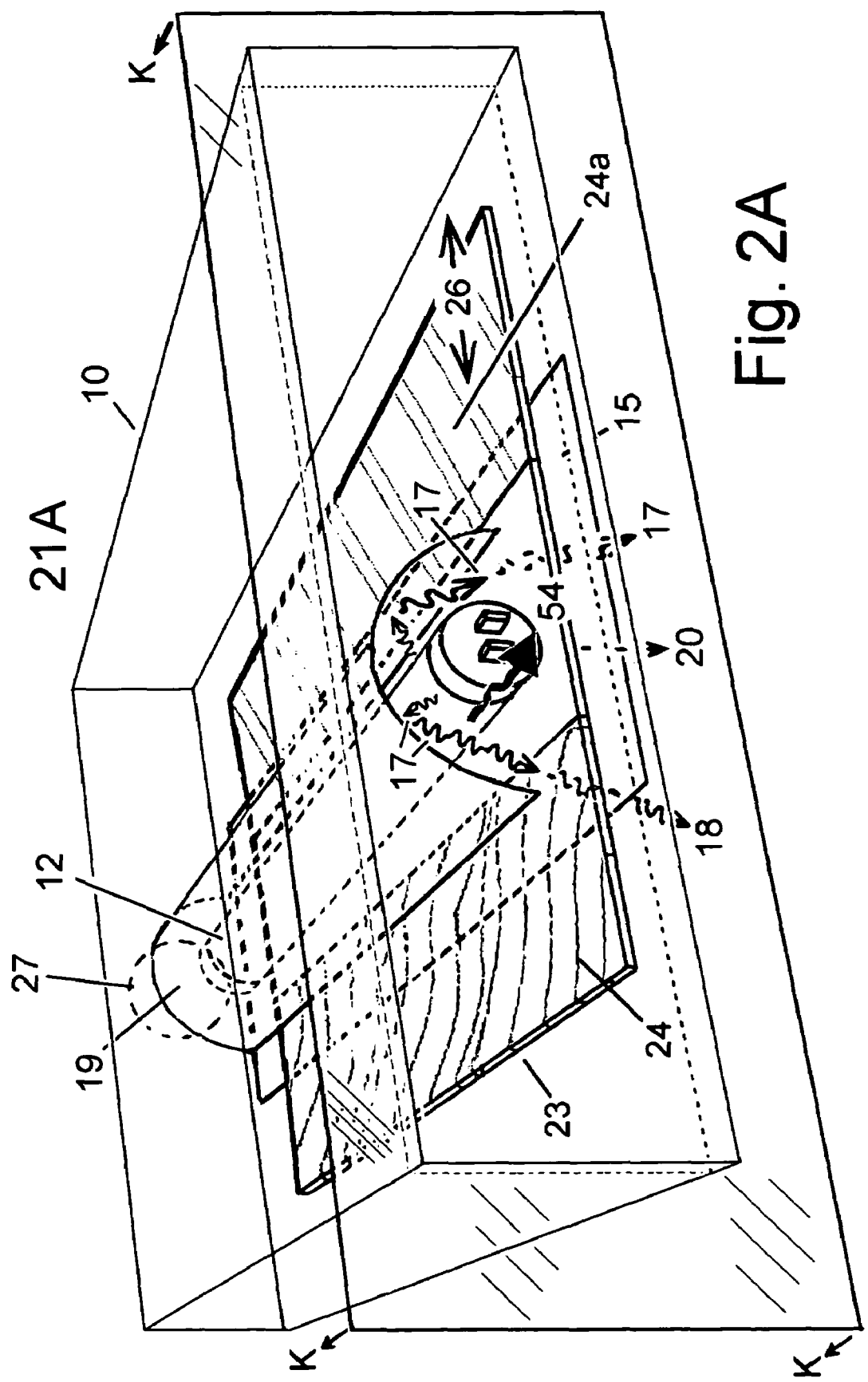
FIG. 2A is a perspective view of apparatus 21A, showing a second embodiment, wherein the WT materials are in the form of a substantially flat WT filter coupled with a pattern of WT materials.

FIG. 2A, a perspective view of apparatus 21A, and 2B, a cross sectional view of apparatus 21A taken on the plane K-K-K, show the second embodiment via, wherein a substantially flat WT filter 23 is coupled to a pattern of WT materials 24 and 24a and where a substantially linear lateral movement 26 is used to select the desired emission of untransformed or transformed radiations 17, 18 (or various combinations). Apparatus 21A comprises a housing 10, having a radiation exit port 15, and a fluid entrance port 27 (note that although not shown, as in the prior embodiment, a fluid exit port also exists.) Additionally, as previously discussed, WT materials 24 and 24a, are bonded, fused, glued, blended, conjoined, fastened, united, merged, joined, integrated, or otherwise associated with the support structure of the substantially flat WT filter 23 that is disposed between the primary UV radiation source 12 and the radiation exit port 15. As in the first embodiment, a reflector 19 is placed on the opposite side of the primary UV radiation source 12 from the radiation exit port 15, so that the reflector 19 directs the primary UV radiation 17 in the preferred direction 20 towards the selected portion of the substantially flat WT filter 23 and thus also towards the radiation exit port 15. The reflector 19 also shades the unselected portions of the substantially flat WT filter 23. The substantially flat WT filter 23 is not easily removable from the housing 10, but is only free to move in a substantially linear lateral motion 26 within the apparatus 21A. A portion of the substantially flat WT filter 23 can be made transparent to the primary UV radiation 17 to allow it to pass to the radiation exit port 15 with no transformation. The plane K-K-K shows where the cross sectional view of FIG. 2B is taken. The substantially flat WT filter 23 can be moved in a substantially linear lateral motion 26 to place either the UV transparent section of the substantially flat WT filter 23 or, a portion of one or more of the WT materials 24 or 24*a* between the primary UV radiation source 12 and the radiation exit port 15 thus causing one or more untransformed or transformed radiations 17, 18, (and/or various combinations thereof), to be emitted from the apparatus 21A. Note that the WT materials 24*a* once moved beneath the primary UV radiation 17 would cause a transformed radiations 18*a* to be emitted from the radiation exit port 15. An arrow shows fluid flow 54 (See FIG. 2A), air or a gas or another type of fluid, passing through the volume created between the three elements consisting of the primary UV radiation source 12, the reflector 19 and the flat WT filter 23 thereby enabling it's sterilization.

As previously explained, and applicable to all embodiments of the present invention, the WT materials 24 and 24*a*, can be bonded, fused, glued, blended, conjoined, fastened, united, merged, joined, integrated, or otherwise unified with the material comprising the substantially flat WT filter 23. This feature will be better shown in FIGS. 2C, 2D, 2E, 2F, 2G, and 2H which are expanded cross sectional views of a portion of the substantially flat WT filter 23 of apparatus 21A, showing variations of the second embodiment where the WT materials 24 and 24*a*, can be integrated, or otherwise combined in a plurality of ways with the material comprising the substantially flat WT filter 23. As before, FIGS. 2C, 2D, 2E, 2F, 2G, and 2H, only show WT material 24*a*, but the same principles apply to the other WT material 24. It should be noted that although not shown on these figures, the principle shown in FIG. 1D wherein a plurality of WT materials may exist and be combined is applicable to all embodiments of this invention and that the WT filter 23 may comprise many more WT material sections than shown herein.

FIGS. 2C, 2D, 2E, 2F, 2G, and 2H, are expanded cross sectional views of a portion of the substantially flat WT filter 23 of apparatus 21A, show examples of the UV transmitting structural material, or the WT material 24 being coupled, or affixed, upon, within, or integral to the WT filter 23 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the WT filter 23

Specifically, FIG. 2C is an expanded view of a portion of the wall of the cylindrical WT filter 23 of apparatus 21A, showing a variation wherein the WT material 24*a*, (representative of any selected WT material), is integral to the structure of the material comprising the cylindrical WT filter 23. Those skilled in the art will recognize that FIG. 1E could also represent a WT filter 23 which inherently has WT properties without the addition of any other WT material 24, 24*a*, etc.

FIG. 2D is an expanded view of a portion of the substantially flat WT filter 23 of apparatus 21A, showing a variation wherein the WT material 24*a*, (representative of any selected WT material) is affixed upon, in such manner as previously discussed, the outer surface of the substantially flat WT filter 23.

FIG. 2E is an expanded view of a portion of the wall of the substantially flat WT filter 23 of apparatus 21A, showing a variation wherein the WT material 24*a*, (representative of any selected WT material) is affixed upon, in such manner as previously discussed, the inner surface of the substantially flat WT filter 23.

FIG. 2F is an expanded view of a portion of the wall of the substantially flat WT filter 23 of apparatus 21A, showing a variation wherein the WT material 24*a*, (representative of any selected WT material) is laminated, or sandwiched, between, in such manner as previously discussed, two layers of UV transparent material comprising the substantially flat WT filter 23.*s*

FIG. 2G is an expanded view of a portion of the wall of the substantially flat WT filter 23 of apparatus 21A, showing a variation wherein the WT material 24*a*, (representative of any selected WT material) is distributed within fiber or wire like shapes that form a mat comprising the material of the cylindrical WT filter 23. For example, a particular WT material 24 or 24*a* can be mixed into molten UV transmitting glass, which is then, as previously discussed, formed into a wire-like shape or a fiber, such as that of fiber optic cable or fiber-glass. These wires or fibers can then be cut into pieces and laid down upon one another to form a mat, etc. The mat can then be formed into various shapes including a substantially flat WT filter 23. It should be noted that the WT material 24*a*, (representative of any selected WT material) can also be integrated, or otherwise associated with the outside of the fiber or wire-like shape.

FIG. 2H is an expanded view of a portion of the wall of the substantially flat WT filter 23 of apparatus 21A, showing a variation of the embodiment where the WT materials 24*a* are associated with fiber or wire like shapes that form a woven mesh comprising the material of the cylindrical WT filter 23. As an example, a woven fiber-glass cloth wherein the individual fibers have WT material 24*a* included in the composition. As a variation, the WT material 24, (24*a*, 24*b*, etc.) can also be bonded, fused, glued, blended, conjoined, fastened, united, merged, joined, integrated, or otherwise associated with the outside of the fiber or wire-like shape.

FIGS. 2I and 2J are cross sectional views of apparatus 21B. Apparatus 21B comprises the components and features of apparatus 21A with the following variation in regard to the substantially flat WT filter 23. In this variation of the second embodiment, the apparatus 21B comprises two substantially flat WT filters 23 and 23*a* which are positioned within the apparatus 21B and wherein the relative motion 26 is substantially linear and lateral and is constrained within the confines of the housing 10; and wherein the substantially flat WT filters 23 and 23*a* are not easily removable from the apparatus 21B; and wherein each substantially flat WT filter 23 and 23*a* has affixed thereto, or integral thereto, a uniform pattern of WT material 24 or 24*a*. As shown and discussed previously, the WT material 24 or 24*a* can be affixed to, or integral to in different ways with the structure of the material comprising the substantially flat WT filter 23 or 23*a*. As previously discussed and shown in FIGS. 2C, 2D, 2E, 2F, 2G, and 2H, the WT material can be on either side of a UV transmitting support surface, between two layers of UV transmitting materials, disposed internally, i.e. integral, to the UV transmitting support material, or the WT material 24 or 24*a* can be affixed to, integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth). As previously, the reflector 19 directs the primary UV radiation 17 towards the radiation exit port 15. FIG. 2I shows that the substantially flat WT filter 23*a* is positioned such that it does not come between the primary UV radiation source 12 and the radiation exit port 15, while the substantially flat WT filter 23 is positioned partially between the primary UV radiation source 12 and the radiation exit port 15 such that both the primary UV radiation 17 and the transformed radiation 18 are emitted from the radiation exit port 15 in a preferred direction 20. FIG. 2J shows the same apparatus 21B wherein the substantially flat WT filters 23 and 23a are switched in position so that substantially flat WT filter 23a is partially between the primary UV radiation source 12 and the radiation exit port 15 and such that a transformed radiation 18a is emitted rather than transformed radiation 18. Note that FIGS. 2I and 2J are variations of the embodiment shown in FIGS. 2A and 2B and as such the features afforded by the housing 10, and the fluid entrance port 27 and the fluid exit port in regard to sterilization of a fluid flow 54 (FIG. 2A) are applicable herein.

In a third embodiment of the present invention one or more primary UV radiation sources are placed behind at least one substantially flat disk shaped WT filter. Portions of the substantially flat disk shaped filter(s) are coupled with different WT materials each of which is capable of producing a transformed radiation upon irradiation by the primary UV radiation. In this embodiment, another portion of the substantially flat disk shaped filter(s) can remain transparent to the primary UV radiation, or even have a portion of the substantially flat disk shaped filter(s) missing. To easily switch between different radiation emissions, transformed or un-transformed, the device rotates the substantially flat disk shaped WT filter (s) such that the desired WT material, the transparent region, or a void or slit in the flat filter, lies between the primary UV radiation source and the radiation exit port of the apparatus. This movement can be accomplished by a mechanical or electrical means through a rotating motion of the substantially flat disk shaped WT filters, such that none, one, or more than one of the WT materials are placed between the primary light source and the radiation exit port of the apparatus to select any combination of wavelengths of radiation.

FIGS. 3A and 3B show a third embodiment via a perspective view of apparatus 31A and 31B. Note that, this embodiment also features a housing 10 as in the prior embodiments. The housing has been removed in FIG. 3A leaving only the radiation exit port 15 visible in this view. As discussed in regard to the prior embodiments, the WT materials 34 and 34a may be bonded, fused, glued, blended, conjoined, fastened, united, merged, joined, integrated, or otherwise applied in different ways to the structure of the material comprising the substantially flat disk shaped WT filter 33. As previously discussed, The WT filter comprises, either as a coupled addition, or as an integral part, the WT materials 34 and 34a integrated with a structural material to become the WT filter 33. As previously discussed, it should be noted that structural material necessarily possesses UV transmitting properties. The WT materials 34 and 34a can be coupled on either side of the UV transmitting structural material surface, sandwiched between two layers of UV transmitting structural materials, disposed internally to the UV transmitting structural material, or the WT material 34 and 34a can be bonded, fused, glued, blended, conjoined, fastened, united, merged, joined, integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material 34 and 34a is actually the WT filter 33.

In this embodiment, the WT materials 34 and 34a are arranged in a pattern on the WT filter 33 and the relative motion between the WT filter 33 and the primary UV radiation source 12 is a substantially planar rotational movement 36 of the disk with respect to the primary UV radiation source 12. Selection of either the substantially flat disk shaped WT material 34, or 34a, or a transparent portion of the substantially flat disk shaped WT filter 33, is made by rotating the substantially flat disk shaped WT filter 33 in its plane. As in the previous embodiments, the substantially flat disk shaped WT filter 33 is between the primary UV radiation source 12 and the radiation exit port 15. The reflector 19 shades the unselected portions of the substantially flat disk shaped WT filter 33 and directs the primary UV radiation 17 toward the WT materials 34 and 34a and thus towards the radiation exit port 15. FIG. 3A shows the substantially flat disk shaped WT filter 33 in a midway position such that both untransformed and transformed radiation 17 and 18 are emitted in a preferred direction 20. Note that, as this embodiment comprises a housing as in the prior embodiments, also included are means to channel a fluid flow. An arrow shows fluid flow 54 (air or a gas or another type of fluid) passing through the volume created between the three elements consisting of the primary UV radiation source 12, the reflector 19 and the flat disk shaped WT filter 33. FIG. 1A, shows the fluid entrance port 27 and the fluid exit port 28 in the housing 10, which features are applicable herein.

An additional feature of this embodiment, is that the apparatus 31A or 31B can be adapted for use with a microscope such that the desired wavelength of primary UV radiation 17 or transformed radiation 18, is selectable by the user through placement of none, one or more than one of the plurality of WT materials 34 or 34a between the primary UV radiation source 12 and the portion of the microscope optics assembly that gathers light for focusing on the object to be observed. The apparatus 31A and 31B is particularly useful for illuminating specimens for study under a microscope, where small mineralogical, chemical or biological samples are examined under various wavelengths of primary UV radiation 17 or transformed radiation 18. The substantially flat disk shaped WT filter 33 and associated housing is convenient for placing this selectable radiation source close to the microscope stage that it is intended to illuminate.

A further feature of this embodiment is shown in FIG. 3B wherein the substantially flat disk shaped WT filter 33, is coupled with a pattern of WT materials 34; and wherein a section of the substantially flat disk shaped WT filter 33 is missing or removed to prevent unnecessary attenuation of the primary UV radiation 17, as discussed in the previous embodiments. The substantially flat disk shaped WT filter 33 is shown in a midway position such that both the primary UV radiation 17 and transformed radiation 18 are emitted in a preferred direction 20.

As previously discussed, the WT materials 34, and 34a, can be integrated, or otherwise combined in a plurality of ways with the material comprising the substantially flat WT filter 33 of apparatus 31A and 31B. FIGS. 3C, 3D, 3E, 3F, 3G, and 3H are expanded cross sectional views of a portion of the substantially flat WT filter 33 of apparatus 31A and 31B, showing variations where the WT materials 34 (representative of any selected WT material such as represented by the WT materials 14, 14a, 14b, 14c, 14d, 14e, 14f of FIG. 1D), possess different WT properties thus showing that a plurality of different transformed radiation emissions may be achieved in the present invention. Additionally, with reference to FIGS. 3C, 3D, 3E, 3F, 3G, and 3H, these Figures show enlarged portions of the WT material 34 in combination with the WT filter 33. As previously explained, FIGS. 3C, 3D, 3E, 3F, 3G, and 3H show examples of the UV transmitting structural material, or the WT material 34, being coupled, or affixed, upon, within, or integral to the WT filter 33 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the WT filter 33.

FIGS. 3C, 3D, 3E, 3F, 3G, and 3H, are expanded cross sectional views taken along the plane S-S-S of a portion of the substantially flat disk shaped WT filter 33 of apparatus 31A and 31B, showing examples of the UV transmitting structural material, or the WT material 34, being coupled, or affixed, upon, within, or integral to the WT filter 33 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the substantially flat disk shaped WT filter 33.

Specifically, FIG. 3C is an expanded view of a portion of the wall of the substantially flat disk shaped WT filter 33 of apparatus 31A and 31B, showing a variation wherein the WT material 34, (representative of any selected WT material), is integral to the structure of the material comprising the substantially flat disk shaped WT filter 33. Those skilled in the art will recognize that FIG. 3C could also represent a substantially flat disk shaped WT filter 33 which inherently has WT properties without the addition of any other WT material 34.

FIG. 3D is an expanded view of a portion of the substantially flat disk shaped WT filter 33 of apparatus 31A and 31B, showing a variation wherein the WT material 34, (representative of any selected WT material) is affixed upon, in such manner as previously discussed, the outer surface of the substantially flat disk shaped WT filter 33.

FIG. 3E is an expanded view of a portion of the wall of the substantially flat disk shaped WT filter 33 of apparatus 31A and 31B, showing a variation wherein the WT material 34, (representative of any selected WT material) is affixed upon, in such manner as previously discussed, the inner surface of the substantially flat disk shaped WT filter 33.

FIG. 3F is an expanded view of a portion of the wall of the substantially flat disk shaped WT filter 33 of apparatus 31A and 31B, showing a variation wherein the WT material 34, (representative of any selected WT material) is laminated, or sandwiched, between, in such manner as previously discussed, two layers of UV transparent material comprising the substantially flat disk shaped WT filter 33.

FIG. 3G is an expanded view of a portion of the wall of the substantially flat disk shaped WT filter 33 of apparatus 31A and 31B, showing a variation wherein the WT material 34, (representative of any selected WT material) is distributed within fiber or wire like shapes that form a mat comprising the material of the substantially flat disk shaped WT filter 33. For example, a particular WT material 34 can be mixed into molten UV transmitting glass, which is then, as previously discussed, formed into a wire-like shape or a fiber, such as that of fiber optic cable or fiber-glass. These wires or fibers can then be cut into pieces and laid down upon one another to form a mat, etc. The mat can then be formed into various shapes including a substantially flat disk shaped WT filter 33. It should be noted that the WT material 34, (representative of any selected WT material) can also be integrated, or otherwise associated with the outside of the fiber or wire-like shape.

FIG. 3H is an expanded view of a portion of the wall of the substantially flat disk shaped WT filter 33 of apparatus 31A and 31B, showing a variation of the embodiment where the WT materials 34 are associated with fiber or wire like shapes that form a woven mesh comprising the material of the substantially flat disk shaped WT filter 33. As an example, a woven fiber-glass cloth wherein the individual fibers have WT material 34a included in the composition. As a variation, the WT material 34, (representative of any selected WT material) can also be bonded, fused, glued, blended, conjoined, fastened, united, merged, joined, integrated, or otherwise associated with the outside of the woven mesh.

A fourth embodiment of the present invention is shown in FIGS. 4A, 4C and 4J. (Line K-K shows where a cross section is taken on FIG. 4A and is shown in FIGS. 4C and 4J.) With reference to these Figures, a fourth embodiment, having a housing 10, and a flexible sheet or belt WT filter 43 is shown. The flexible sheet or belt WT filter 43 has a bend radius and elastic properties such that the flexible sheet or belt WT filter 43 can be rolled and unrolled onto, or past a pair of cylindrical rollers 49. Rotating the cylindrical rollers 49 causes a movement 46 of the flexible sheet or belt WT filter 43 with respect to the primary UV radiation source(s) 12. In this manner, one or more sections of the flexible sheet or belt WT filter 43 are placed between the primary UV radiation source 12 and the radiation exit port 15. As in the previous embodiments, a reflector 19 is placed on the opposite side of the primary UV radiation source 12 from the radiation exit port 15. Arrows show fluid flow 54 (air or a gas or another type of fluid) passing through the volume created between the three elements consisting of the primary UV radiation source 12, the reflector 19 and the flexible sheet or belt WT filter 43.

Figure 4B:
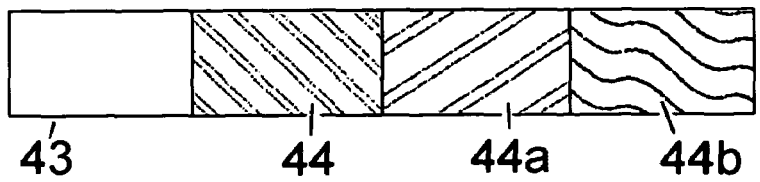
FIG. 4B is a plan view of an exemplary flexible sheet or belt WT filter coupled with WT materials as used in the device of FIG. 4A.

Referring to FIG. 4B, a plan view of the flexible sheet or belt WT filter 43 having sections that are bonded, fused, glued, blended, conjoined, fastened, united, merged, joined, integrated, or otherwise associated with WT materials 44, 44a, and 44b and also having a UV transparent section is shown. Such flexible sheet or belt WT filter 43 may be a belt of determined length, as exemplified in FIG. 4C by apparatus 41A, or may also be an endless, or continuous, belt by virtue of having its ends coupled together as is exemplified in FIG. 4J by apparatus 41B. In either case, the flexible sheet or belt WT filter 43 is comprised of a plurality of sections, both transparent and/or with WT materials 44, 44a, and 44b affixed thereto. Additionally, the feature of the flexible sheet or belt WT filter 43 having at least one section that is transparent to the primary UV radiation 17 allows passage out of the radiation exit port 15 primary UV radiation 17 with no transformation.

As previously discussed in regard to the other embodiments, the WT materials 44, 44a, and 44b can be bonded, fused, glued, blended, conjoined, fastened, united, merged, joined, integrated, or otherwise associated in different ways with the structure of the material comprising the flexible sheet or belt WT filter 43. Also as previously discussed, the WT material 44, 44a, and 44b can be on either side of a UV transmitting support surface, between two layers of UV transmitting materials, disposed internally to the UV transmitting support material, or the WT material 44, 44a, and 44b can be bonded, fused, glued, blended, conjoined, fastened, united, merged, joined, integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth). As a variation, the WT material 44, 44a, and 44b can also be bonded, fused, glued, blended, conjoined, fastened, united, merged, joined, integrated, or otherwise associated with the outside of the fiber or wire-like shape. Note that FIGS. 4A, 4C and 4J are variations of the embodiment shown in FIGS. 2A and 2B and as such the features afforded by the housing 10, and the fluid entrance port 27 and the fluid exit port in regard to sterilization of a fluid flow 54 (FIGS. 2A, and 4A, 4C, 4J) are applicable herein.

Referring specifically to FIG. 4C, the flexible sheet or belt WT filter 43 is coupled with a set of cylindrical rollers 49 such that the flexible sheet or belt WT filter 43 can be rolled or unrolled onto the cylindrical rollers 49 by there rotational movement, which in turn causes a movement 46 of the flexible sheet or belt WT filter 43, with respect to the primary UV radiation source 12 and in such a manner as to place either a transparent section or, one or more of the WT materials 44, (representative of any selected WT material) between the primary UV radiation source 12 and the radiation exit port 15 thus causing one or more primary UV radiation 17 and/or transformed radiation 18, to be emitted. Note that although not shown, as in the previous embodiments, as multiple sections of the flexible sheet or belt WT filter 43 are in position with respect to the primary UV radiation source 12, the transformed radiation 18 may comprise more than a single UV radiation wavelength that may be emitted from the radiation exit port 15. As in the previous embodiments, a reflector 19 is placed on the opposite side of the primary UV radiation sources 12 from the radiation exit port 15, so that the reflector 19 directs the primary UV radiation 17 in the preferred direction 20 towards the selected portion of the flexible sheet or belt WT filter 43 and thus also towards the radiation exit port 15. Note also that in one variation of the present invention, one of the WT materials 44a of the flexible sheet or belt WT filter 43 can be black so that black section converts primary UV radiation 17 to invisible infrared transformed radiation 18 (not shown herein), such that neither UV radiation 17 nor visible radiation 18 is emitted from the apparatus 41A.

Referring specifically to FIG. 4J, a cross section of a variation of the fourth embodiment, apparatus 41 A of FIGS. 4A and 4C, is shown as apparatus 41B. Apparatus 41B is substantially the same as apparatus 41A except that the flexible sheet or belt WT filter 43 has its ends joined together thereby being configured to be a continuous loop, or endless belt. The construction of this continuous loop, or endless belt, in regard to the WT materials 44n is the same as previously discussed in regard to FIG. 4B. The flexible sheet or belt WT filter 43 is disposed around a set of cylindrical rollers 49 such that the flexible sheet or belt WT filter 43 can be moved around and past the cylindrical rollers 49 by rotational movement 46 in a manner similar to a conveyer belt. Such movement 46 of the flexible sheet or belt WT filter 43, with respect to the primary UV radiation source 12, places either a transparent section or, one or more of the WT materials 44, (representative of any selected WT material) between the primary UV radiation source 12 and the radiation exit port 15 thus causing one or more primary UV radiation 17 and/or transformed radiation 18, or any combination thereof to be emitted. At least one section of the flexible sheet or belt WT filter 43 is transparent to the primary UV radiation 17. As in the previous embodiments, a reflector 19 is placed on the opposite side of the primary UV radiation sources 12 from the radiation exit port 15, so that the reflector 19 helps to direct the primary UV radiation 17 in the preferred direction 20 towards the selected portion of the flexible sheet or belt WT filter 43 and thus also towards the radiation exit port 15. Note also that in one variation of the present invention, one WT section of the flexible sheet or belt WT filter 43 can be black so that no UV radiation 17 or transformed radiation 18 passes through the material when that portion is selected—i.e., the black section converts primary UV radiation 17 to invisible infrared transformed radiation 18. Apparatus 41B is particularly suitable for use with transilluminators, such as are used in biological research for viewing of electrophoresis gels used for analysis of DNA or other biochemical materials. Another particular use for apparatus 41B, is in a light fixture that sterilizes the air in a room while at the same time providing a choice between allowing the primary UV radiation 17 to be emitted into the room (for general area sterilization) or a transformed radiation 18 (white visible light) or no visible radiation at all. In such a use, the flexible sheet or belt WT filter 43 would comprise three sections; 1) one that is black allowing only transformed infrared radiation 18 to be emitted having no UV radiation or visible radiation emitted, 2) one section that produces another transformed radiation 18 having white visible light, and 3) one section that is transparent to the primary UV radiation 17. Further, in such a use, a fluid flow 54 of air circulated from the room would be enabled as previously discussed. Thus apparatus 41B would allow selecting the emitted UV radiation 17 or transformed radiation(s) 18, thereby 1) providing no illumination or UV radiation thus providing darkness, or 2) providing general area illumination via transformed radiation 18, or 3) providing primary UV radiation 17 for general area sterilization of the room. And, in all 3 modes, simultaneously sterilizing the air flow 54 of the room.

As previously discussed, the WT materials 44, 44a and 44b, can be integrated, or otherwise combined in a plurality of ways with the material comprising the substantially flat WT filter 43 of apparatus 41A and 41B. FIGS. 4D, 4E, 4F, 4G, 4H and 4I are expanded cross sectional views of a portion of the flexible sheet or belt WT filter 43 of apparatus 41A and 41B, showing variations where the WT materials 44, 44a and 44b (representative of any selected WT material such as represented by the WT materials 14, 14a, 14b, 14c, 14d, 14e, 14f, 14n, of FIG. 1D), possess different WT properties thus showing that a plurality of different transformed radiation emissions may be achieved in the present invention. Additionally, with reference to FIGS. 4D, 4E, 4F, 4G, 4H and 4I, are shown enlarged portions of the WT materials 44, 44a and 44b in combination with the WT filter 43. These enlarged views show examples of the UV transmitting structural material, the WT materials 44, 44a and 44b (representative of any selected WT material), being coupled, or affixed, upon, within, or integral to the WT filter 43 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the WT filter 43.

FIGS. 4D, 4E, 4F, 4G, 4H, and 4I are expanded cross sectional views of a portion of the flexible sheet or belt WT filter 43 of apparatus 41A and 41B, showing examples of the UV transmitting structural material, or the WT material 44, being coupled, or affixed, upon, within, or integral to the WT filter 43 material, or integrated, or otherwise unified with a wire or fiber shape and then constructed into a mat of fibers (similar to strands of fiber optic cable or fiber-glass strands used in fiber-glass matting), or the wire or fiber shaped material can be woven into a screen or cloth (similar to fiber-glass cloth) such that, as mentioned previously, the WT material is actually the flexible sheet or belt WT filter 43.

Specifically, FIG. 4D is an expanded cross sectional view of a portion of the flexible sheet or belt WT filter 43 of apparatus 41 A and 41B, showing a variation wherein the WT material 44, (representative of any selected WT material, including WT material 44a, or 44b), is integral to the structure of the material comprising the flexible sheet or belt WT filter 43, (or the structural material of that portion of the flexible sheet or belt WT filter 43 has WT properties without the addition of any other WT material 44, 44a, or 44b).

FIG. 4E is an expanded cross sectional view of a portion of the flexible sheet or belt WT filter 43 of apparatus 41A and 41B, showing a variation of the fourth embodiment where the WT material 44, (representative of any selected WT material, including WT material 44a, or 44b) is affixed upon, in such manner as previously discussed, the outer surface of the material comprising the flexible sheet or belt WT filter 43.

FIG. 4F is an expanded cross sectional view of a portion of the flexible sheet or belt WT filter 43 of apparatus 41A and 41B, showing a variation of the fourth embodiment where the WT material 44, (representative of any selected WT material, including WT material 44a, or 44b) is affixed upon, in such manner as previously discussed, the inner surface of the material comprising the flexible sheet or belt WT filter 43.

FIG. 4G is an expanded cross sectional view of a portion of the flexible sheet or belt WT filter 43 of apparatus 41A and 41B, showing a variation of the fourth embodiment where the WT material 44, (representative of any selected WT material, including WT material 44a, or 44b) is laminated, or sandwiched, between, in such manner as previously discussed, two layers of UV transparent material comprising the flexible sheet or belt WT filter 43.

FIG. 4H is an expanded cross sectional view of a portion of the flexible sheet or belt WT filter 43 of apparatus 41A and 41B, showing a variation of the fourth embodiment where the WT material 44, (representative of any selected WT material, including WT material 44a, or 44b) is distributed within fiber or wire like shapes that form a mat comprising the material of the flexible sheet or belt WT filter 43. For example, a particular WT material 44 can be mixed into molten UV transmitting glass, which is then, as previously discussed, formed into a wire-like shape or a fiber, such as that of fiber optic cable or fiber-glass. These wires or fibers can then be cut into pieces and laid down upon one another to form a mat, etc. The mat can then be formed into various shapes including the flexible sheet or belt WT filter 43. It should be noted that the WT material 44, (representative of any selected WT material, including WT material 44a, or 44b) can also be integrated, or otherwise associated with the outside of the fiber or wire-like shape.

FIG. 4I is an expanded cross sectional view of a portion of the flexible sheet or belt WT filter 43 of apparatus 41A and 41B, showing a variation of the fourth embodiment where the WT material 44, (representative of any selected WT material, including WT material 44a, or 44b) are associated with fiber or wire like shapes that form a woven mesh comprising the material of the flexible sheet or belt WT filter 43. As an example, a woven fiber-glass cloth wherein the individual fibers have WT material 44, (representative of any selected WT material, including WT material 44a, or 44b) included in the composition. As a variation, the WT material 44, (representative of any selected WT material, including WT material 44a, or 44b) can also be bonded, fused, glued, blended, conjoined, fastened, united, merged, joined, integrated, or otherwise associated with the outside of the woven mesh.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. It will doubtless be obvious to those of ordinary skill in the art that there are other embodiments employing these principles that are not described in detail herein.

I claim:

1. An apparatus for selectively emitting one or more of a plurality of wavelength distributions of radiation, comprising:
    a primary UV radiation source, disposed in a housing, wherein said primary UV radiation source produces a primary wavelength distribution;
    at least one wavelength-transforming material, deposed external to the envelope of said primary UV radiation source, that in response to irradiation by said primary UV radiation source, emits a transformed radiation;
    a selection mechanism deposed internal to the housing, wherein said selection mechanism is substantially non-removably coupled to the housing;
    wherein said selection mechanism places at least one selected portion of said at least one wavelength-transforming materials relative to said primary UV radiation source;
    a reflector unit disposed proximate to said primary UV radiation source wherein said reflector unit directs the primary wavelength distribution radiation from said primary UV radiation source onto said at least one wavelength-transforming material; and
    wherein said reflector unit is also deposed relative to said primary UV radiation source such that non-selected portions of said at least one wavelength-transforming materials are shaded from irradiation by said primary UV radiation source.

2. The apparatus of claim 1 further comprising a wavelength transforming filter, wherein said wavelength transforming filter supports and is combined with said at least one wavelength-transforming material.

3. The apparatus of claim 2 wherein said selection mechanism imparts relative motion between said wavelength transforming filter and said primary UV radiation source thereby positioning said wavelength transforming filter to place said at least one selected portion of said at least one wavelength-transforming materials in position to be irradiated by said primary UV radiation source.

4. The apparatus of claim 3 wherein said wavelength transforming filter is substantially in the shape of a cylinder encompassing said primary UV radiation source and said reflector unit.

5. The apparatus of claim 3 wherein said wavelength transforming filter is in the shape of at least one substantially flat plate disposed opposite to and sequentially after said primary UV radiation source and said reflector unit.

6. The apparatus of claim 3 wherein said wavelength transforming filter is in the shape of a substantially flat rotatable disk disposed opposite to and sequentially after said primary UV radiation source and said reflector unit.

7. The apparatus of claim 3 wherein said wavelength transforming filter is substantially in the shape of a flexible sheet or belt encompassing said primary UV radiation source and said reflector unit.

8. The apparatus of claim 2 further comprising at least one additional wavelength-transforming material, deposed external to the envelope of said primary UV radiation source, that in response to irradiation by said primary UV radiation source, emits a second transformed radiation, wherein said at least one additional wavelength-transforming material is supported by and combined with said wavelength transforming filter.

9. The apparatus of claim 8 wherein said selection mechanism imparts relative motion between said wavelength transforming filter and said primary UV radiation source thereby positioning said wavelength transforming filter to place singularly or in combination: a) said at least one selected portion of said at least one wavelength-transforming materials, and b) said at least one additional wavelength-transforming material, in position to be irradiated by said primary UV radiation source.

10. The apparatus of claim 9 wherein said wavelength transforming filter is substantially in the shape of a cylinder encompassing said primary UV radiation source and said reflector unit.

11. The apparatus of claim 9 wherein said wavelength transforming filter is in the shape of at least one substantially flat plate disposed opposite to and sequentially after said primary UV radiation source and said reflector unit.

12. The apparatus of claim 9 wherein said wavelength transforming filter is in the shape of a substantially flat rotatable disk disposed opposite to and sequentially after said primary UV radiation source and said reflector unit.

13. The apparatus of claim 9 wherein said wavelength transforming filter is substantially in the shape of a flexible sheet or belt encompassing said primary UV radiation source and said reflector unit.

14. An apparatus for selectively emitting one or more of a plurality of wavelength distributions of radiation, comprising:
 a primary UV radiation source, disposed in a housing, wherein said primary UV radiation source produces a primary wavelength distribution;
 a wavelength transforming filter, deposed external to the envelope of said primary UV radiation source;
 a selection mechanism coupled to said wavelength transforming filter and deposed internal to the housing, wherein said selection mechanism and said wavelength transforming filter are substantially non-removably deposed internal to the housing;
 a reflector unit disposed proximate to said primary UV radiation source wherein said reflector unit directs the primary wavelength distribution radiation from said primary UV radiation source towards said wavelength transforming filter; and
 wherein said reflector unit is also deposed relative to said primary UV radiation source such that portions of said wavelength transforming filter are shaded from irradiation by said primary UV radiation source.

15. The apparatus of claim 14 wherein said reflector unit is further deposed to direct the primary wavelength distribution in a preferred direction.

16. The apparatus of claim 15 wherein said wavelength transforming filter comprises at least one wavelength transforming material.

17. The apparatus of claim 16 wherein said wavelength transforming filter further comprises at least one portion lacking wavelength transforming material, wherein said at least one portion lacking wavelength transforming material is transparent to the primary wavelength distribution.

18. The apparatus of claim 16 wherein at least one selection of said at least one wavelength transforming material is black.

19. The apparatus of claim 16 wherein at least one selection of said wavelength transforming material in response to irradiation by said primary UV radiation source, emits at least one transformed radiation.

20. The apparatus of claim 16 wherein said wavelength transforming filter is substantially in the shape of a cylinder encompassing said primary UV radiation source and said reflector unit.

21. The apparatus of claim 16 wherein said wavelength transforming filter is in the shape of at least one substantially flat plate disposed opposite to and sequentially after said primary UV radiation source and said reflector unit.

22. The apparatus of claim 16 wherein said wavelength transforming filter is in the shape of a substantially flat rotatable disk disposed opposite to and sequentially after said primary UV radiation source and said reflector unit.

23. The apparatus of claim 16 wherein said wavelength transforming filter is substantially in the shape of a flexible sheet or belt encompassing said primary UV radiation source and said reflector unit.

24. The apparatus of claim 16 wherein said wavelength transforming filter is constructed to form an opening in at least a portion of said wavelength transforming filter thereby permitting said primary wavelength distribution to emit there-thru unattenuated.

* * * * *